(12) United States Patent
Noguchi et al.

(10) Patent No.: US 8,213,108 B2
(45) Date of Patent: Jul. 3, 2012

(54) STORAGE MEDIUM LIBRARY DEVICE AND STORAGE MEDIUM LIBRARY DEVICE CARTRIDGE TRANSPORTING METHOD

(75) Inventors: Wataru Noguchi, Tokyo (JP); Shinichi Sudou, Tokyo (JP)

(73) Assignee: NEC Corporation, Tokyo (JP)

( * ) Notice: Subject to any disclaimer, the term of this patent is extended or adjusted under 35 U.S.C. 154(b) by 902 days.

(21) Appl. No.: 12/270,538

(22) Filed: Nov. 13, 2008

(65) Prior Publication Data

US 2009/0129215 A1  May 21, 2009

(30) Foreign Application Priority Data

Nov. 15, 2007  (JP) ................................. 2007-297291

(51) Int. Cl.
*G11B 15/68* (2006.01)
*G11B 21/08* (2006.01)

(52) U.S. Cl. .................................... 360/92.1; 369/30.67

(58) Field of Classification Search ................. 360/92.1; 369/30.4, 30.41, 30.42, 30.54, 30.66, 30.67; 720/615

See application file for complete search history.

(56) References Cited

U.S. PATENT DOCUMENTS

| | | | | |
|---|---|---|---|---|
| 5,345,350 | A * | 9/1994 | Ellis et al. | 360/92.1 |
| 5,818,723 | A * | 10/1998 | Dimitri | 700/214 |
| 6,693,759 | B2 * | 2/2004 | Owens et al. | 360/69 |
| 7,054,086 | B2 * | 5/2006 | Masuda | 360/55 |
| 7,130,148 | B2 * | 10/2006 | Tanaka | 360/92.1 |
| 7,158,326 | B2 * | 1/2007 | Hanagata | 360/69 |
| 7,349,168 | B2 * | 3/2008 | Yasue | 360/69 |
| 7,388,730 | B2 * | 6/2008 | Hori | 360/92.1 |
| 7,480,111 | B2 * | 1/2009 | Ikeuchi et al. | 360/69 |
| 7,800,860 | B2 * | 9/2010 | Steinhilber | 360/92.1 |
| 8,046,099 | B2 * | 10/2011 | Ishitsuka | 700/214 |
| 2001/0013990 | A1 * | 8/2001 | Ostwald et al. | 360/92 |
| 2003/0117744 | A1 * | 6/2003 | Tanaka | 360/92 |
| 2004/0249496 | A1 * | 12/2004 | Sumi et al. | 700/214 |

FOREIGN PATENT DOCUMENTS

| | | | |
|---|---|---|---|
| JP | 51-035968 A | | 3/1976 |
| JP | 56-080848 A | | 7/1981 |
| JP | 3-287330 A | | 12/1991 |
| JP | 10-199102 A | | 7/1998 |
| JP | 11096641 A | * | 4/1999 |
| JP | 2003022664 A | | 1/2003 |
| JP | 2003123363 A | | 4/2003 |
| JP | 2003196901 A | | 7/2003 |
| JP | 2004178702 A | | 6/2004 |
| JP | 2005135498 A | | 5/2005 |
| JP | 2008004207 A | | 1/2008 |
| WO | 2007043129 A | | 4/2007 |

OTHER PUBLICATIONS

Japanese Office Action for JP2007-297291 issued Nov. 10, 2009.

* cited by examiner

*Primary Examiner* — Brian Miller

(57) ABSTRACT

To provide a plurality of magazines very closely by saving the space for forming the moving path that is required for allowing a cartridge transporting device to move. A movable magazine that is capable of moving in the lateral direction individually is provided between a first fixed magazine and a second fixed magazine located on both sides. The movable magazine is moved from the position of a cartridge loading/unloading face that corresponds to a cell to which a cartridge as a mount target for a magnetic tape drive is being housed or a cell to which a cartridge that is unmounted from the magnetic tape drive is to be housed so as to form a longitudinal moving path for allowing the cartridge transporting device to move between the magazines neighboring to each other.

10 Claims, 16 Drawing Sheets

FIG.12A

| $\ell$ | $\ell(2,1)$<br>A | $\ell(2,2)$<br>B | $\ell(2,3)$<br>— | $\ell(2,4)$<br>— |
|---|---|---|---|---|
|  | $\ell(1,1)$<br>E | $\ell(1,2)$<br>F | $\ell(1,3)$<br>G | $\ell(1,4)$<br>— |

FIG.12B

| c | $c(2,1)$<br>H | $c(2,2)$<br>I | $c(2,3)$<br>J |
|---|---|---|---|
|  | $c(1,1)$<br>K | $c(1,2)$<br>— | $c(1,3)$<br>N |

FIG.12C

| r | $r(2,1)$<br>— | $r(2,2)$<br>S | $r(2,3)$<br>T | $r(2,4)$<br>— |
|---|---|---|---|---|
|  | $r(1,1)$<br>U | $r(1,2)$<br>V | $r(1,3)$<br>W | $r(1,4)$<br>— |

FIG.13A

| L | L(2,1) — | L(2,2) — | L(2,3) — | L(2,4) — |
|---|---|---|---|---|
|   | L(1,1) — | L(1,2) — | L(1,3) — | L(1,4) — |

FIG.13B

| R | R(2,1) — | R(2,2) — | R(2,3) — | R(2,4) — |
|---|---|---|---|---|
|   | R(1,1) — | R(1,2) — | R(1,3) — | R(1,4) — |

FIG.14A

| L | L(2,1)<br>A | L(2,2)<br>B | L(2,3)<br>— | L(2,4)<br>— |
|---|---|---|---|---|
|   | L(1,1)<br>E | L(1,2)<br>F | L(1,3)<br>G | L(1,4)<br>— |

FIG.14B

| R | R(2,1)<br>H | R(2,2)<br>I | R(2,3)<br>J | R(2,4)<br>— |
|---|---|---|---|---|
|   | R(1,1)<br>K | R(1,2)<br>— | R(1,3)<br>N | R(1,4)<br>— |

FIG.15A

| L | L(2,1)<br>— | L(2,2)<br>— | L(2,3)<br>— | L(2,4)<br>— |
|---|---|---|---|---|
|   | L(1,1)<br>— | L(1,2)<br>— | L(1,3)<br>— | L(1,4)<br>— |

FIG.15B

| R | R(2,1)<br>— | R(2,2)<br>S | R(2,3)<br>T | R(2,4)<br>— |
|---|---|---|---|---|
|   | R(1,1)<br>U | R(1,2)<br>V | R(1,3)<br>W | R(1,4)<br>— |

STORAGE MEDIUM LIBRARY DEVICE AND STORAGE MEDIUM LIBRARY DEVICE CARTRIDGE TRANSPORTING METHOD

CROSS-REFERENCE TO RELATED APPLICATION

This application is based upon and claims the benefit of priority from Japanese patent application No. 2007-297291, filed on Nov. 15, 2007, the disclosure of which is incorporated herein in its entirety by reference.

BACKGROUND OF THE INVENTION

1. Field of the Invention

The present invention relates to improvements of a cartridge transporting device which transports a cartridge having a built-in magnetic tape or the like between each cell of a magazine and a storing/reproducing device such as a magnetic tape drive, and to improvements of a storage medium library device cartridge transporting method.

2. Description of the Related Art

Already-known as such device is a storage medium library device which includes: a storing/reproducing device for reading/writing data from/to a storage medium by mounting cartridges and magazines having a plurality of cells for housing the cartridges that include built-in storage mediums; and a cartridge transporting device for transporting the cartridges by reciprocating between each cell and the storing/reproducing device.

With this type of storage medium library device, it is common to fixedly place a plurality of magazines broadwise at specific intervals so as to transport the cartridge by moving the cartridge transporting device through utilizing the space between each of the magazines to pass and receive the cartridge.

Therefore, it is always necessary to provide a moving path between the neighboring magazines for allowing the cartridge transporting device to pass, so that two or more magazines cannot be provided very closely. As a result, the number of cartridges that can be housed inside the magazines becomes greatly limited or the storage medium library device itself becomes large-scaled.

As techniques for improving such shortcomings, there have already been proposed a magnetic-tape cartridge library device disclosed in Japanese Unexamined Patent Publication 2003-196901 (Patent Document 1) and a magnetic-tape library device disclosed in Japanese Unexamined Patent Publication 2004-178702 (Patent Document 2), for example.

The magnetic-tape cartridge library device depicted in Patent Document 1 has a control mechanism and a power supply arranged on the left and right sides of a tape deck, and a hand mechanism as a kind of a cartridge transporting device provided in the front side of the tape deck that is located in the center. At the same time, the magnetic tape cartridge library has lengthy magazines provided in parallel in both sides of the hand mechanism, i.e., on the front side of the control mechanism and the power supply, by utilizing the fact that the area occupied by the control mechanism and the power supply is smaller than the area occupied by the tape deck. The magnetic-tape cartridge library device is formed to be capable of removing the cartridge from the cell of the magazine that is at a position interfering with the left and right side faces of the tape deck through moving the magazines on both sides in longitudinal directions.

That is, this magnetic-tape cartridge library device is basically designed to achieve effective utilization of a dead space generated on the left and right sides of the tape deck. Thus, it naturally comes to have a structure where the hand mechanism is surrounded by the magazines on both sides and the tape deck, so that the hand mechanism itself cannot be moved because of such structure. Therefore, it is not possible with this magnetic-tape cartridge library device to be applied to a structure where magazines are provided over three rows or more.

Meanwhile, the magnetic-tape library device depicted in Patent Document 2 is structured to move a picker hand in three axial directions of X, Y, and Z, so that it is possible to make an access to the magazines from arbitrary directions such as the vertical direction, the lateral direction, and the back-to-front direction to remove the cartridge therefrom.

However, in order to avoid interferences between the moving mechanism of the picker hand and the moving mechanism of the magazines, it is necessary to provide those moving mechanisms on the top and bottom separately. Particularly, because the moving mechanism of the picker hand is disposed on the upper side of the magazine, the relative proportion of the space for the picker hand to move becomes large unless the magnetic-tape library device is formed in a large scale to some extent. This results in having such shortcoming that the space within the magnetic-tape library cannot be efficiently utilized.

SUMMARY OF THE INVENTION

It is therefore an exemplary object of the present invention to provide a storage medium library device capable of housing the cartridges in a highly-dense manner by utilizing the space of the moving path that is required for the cartridge transporting device to make movements, and to a cartridge transporting method of the storage medium library device.

The storage medium library device according to an exemplary aspect of the invention is a storage medium library device which includes: magazines having a plurality of cells for housing cartridges each including a built-in storage medium; a storing/reproducing device which writes/reads data to/from the storage medium by mounting the cartridge; and a cartridge transporting device which transports the cartridge by reciprocating between each of the cells of the magazines and the storing/reproducing device. In order to achieve the foregoing exemplary objects, the storage medium library device is particularly structured, including:

a first magazine and a second magazine disposed respectively at both ends of a magazine providing area in its lateral-width direction in such a manner that respective cartridge loading/unloading faces having cartridge loading/unloading ports for each of the cells become substantially in parallel to each other;

a movable magazine capable of freely moving in a direction orthogonal to the cartridge loading/unloading faces provided between the first magazine and the second magazine in such a manner that a cartridge loading/unloading face of the movable magazine becomes substantially in parallel to the cartridge loading/unloading faces of the first magazine and the second magazine;

a magazine rearranging device for forming a longitudinal moving path between the movable magazine and one of the first magazine or the second magazine by moving the movable magazine to a direction orthogonal to the cartridge loading/unloading face of the movable magazine;

a transporting-device lateral feeding device for setting position of the cartridge transporting device at an end part of the formed longitudinal moving path by moving the cartridge transporting device along a lateral moving path extended in parallel to the moving direction of the movable magazine at a position that does not interfere with a magazine moving area where the movable magazine moves; and a transporting-device longitudinal feeding device for moving the cartridge transporting device along the longitudinal moving path, wherein the storing/reproducing device is arranged at a position capable of passing and receiving the cartridge between the cartridge transporting device that is located on the lateral moving path.

Further, the cartridge transporting method of the storage medium library device according to another exemplary aspect of the invention is a cartridge transporting method which moves a cartridge transporting device between a storing/reproducing device and magazines having a plurality of cells for housing cartridges each including a built-in storage medium to transport the cartridge between each of the cells of the magazines and the storing/reproducing device. In order to achieve the same foregoing exemplary objects, the method includes:

moving a movable magazine, which is attached to be movable between a first magazine and a second magazine provided respectively on a first side an a second side of a magazine providing area in its lateral width direction, to a direction orthogonal to a cartridge loading/unloading face of the movable magazine to form a longitudinal moving path between the movable magazine and the first moving path or the second moving path;

moving the cartridge transporting device along the longitudinal moving path; and transporting the cartridge between each of the cells of the respective magazines and the storing/reproducing device.

BRIEF DESCRIPTION OF THE DRAWINGS

FIG. 12 shows conceptual diagrams illustrating housing-position storage tables where corresponding relations between each cell of the magazines and the identification information of the cartridges housed inside each cell are stored, in which FIG. 12A is a housing-position storage table for a second fixed magazine, FIG. 12B is a housing-position storage table for a movable magazine, and FIG. 12C is a housing-position storage table for a first fixed magazine;

FIG. 13 shows conceptual diagrams illustrating housing-position temporary storage tables where corresponding relations between each cell of the neighboring magazines of the cartridge transporting device and the identification information of the cartridges housed inside each cell are stored temporarily, in which FIG. 13A is a housing-position temporary storage table for a left-side magazine for temporarily storing the corresponding relation between each cell of the magazine neighboring to the cartridge transporting device on the left side and the identification information of the cartridges housed inside each cell, and FIG. 13B is a housing-position temporary storage table for a right-side magazine for temporarily storing the corresponding relation between each cell of the magazine neighboring to the cartridge transporting device on the right side and the identification information of the cartridges housed inside each cell;

FIG. 14 shows conceptual diagrams illustrating housing-position temporary storage tables when the movable magazine is moved to the first fixed magazine side, in which FIG. 14A is a housing-position temporary storage table for a left-side magazine for temporarily storing the corresponding relation between each cell of the magazine neighboring to the cartridge transporting device on the left side and the identification information of the cartridges housed inside each cell, and FIG. 14B is a housing-position temporary storage table for a right-side magazine for temporarily storing the corresponding relation between each cell of the magazine neighboring to the cartridge transporting device on the right side and the identification information of the cartridges housed inside each cell;

FIG. 15 shows conceptual diagrams illustrating housing-position temporary storage tables when the movable magazine is moved to the second fixed magazine side, in which FIG. 15A is a housing-position temporary storage table for a left-side magazine for temporarily storing the corresponding relation between each cell of the magazine neighboring to the cartridge transporting device on the left side and the identification information of the cartridges housed inside each cell, and FIG. 15B is a housing-position temporary storage table for a right-side magazine for temporarily storing the corresponding relation between each cell of the magazine neighboring to the cartridge transporting device on the right side and the identification information of the cartridges housed inside each cell.

DETAILED DESCRIPTION OF THE EXEMPLARY EMBODIMENT

Next, a first exemplary embodiment where the present invention is applied to a magnetic-tape library device will be described in detail by referring to the accompanying drawings.

Figure 1:
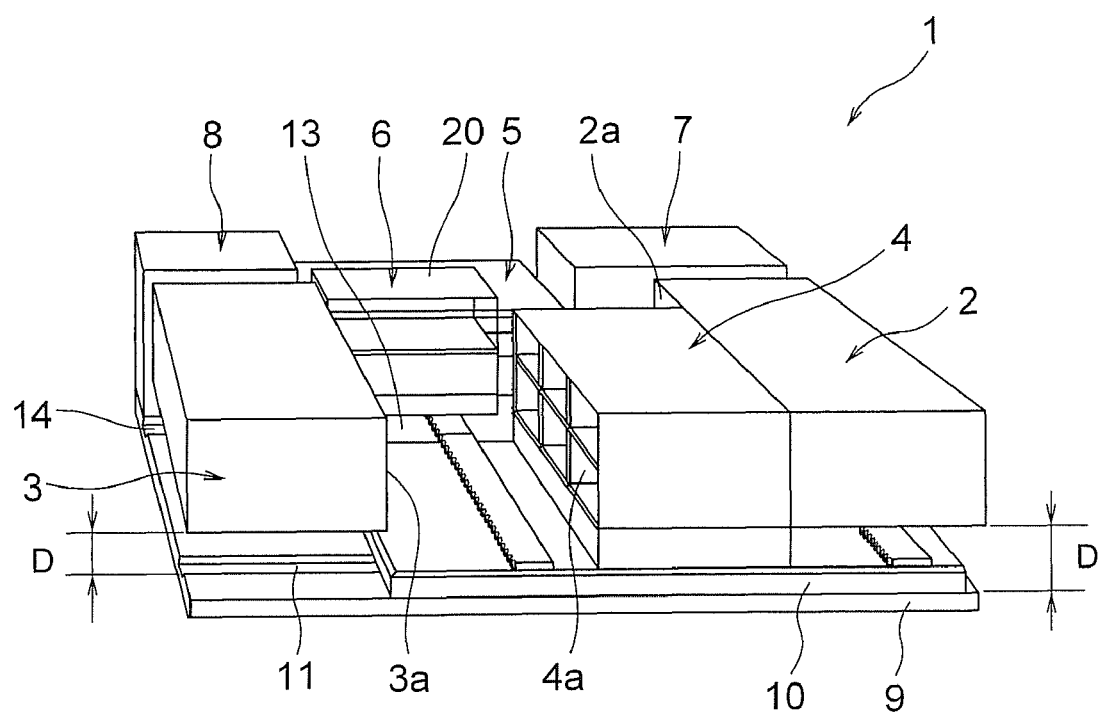
FIG. 1 is a perspective view of a structure of a magnetic-tape library device according to a first exemplary embodiment to which the invention is applied, which shows a state where an outer casing is detached.

FIG. 1 is a perspective view of a structure of a magnetic-tape library device 1 according to the first exemplary embodiment to which the present invention is applied, which shows a state where an outer casing is detached. Further, FIG. 2 is a plan view showing simplified layout of each part of the magnetic-tape library device 1.

The magnetic-tape library device 1 includes: a plurality of magazines each having a plurality of cells for housing cartridges containing a built-in magnetic tape that is a kind of a storage medium, i.e., a first magazine 2 (referred to as a first fixed magazine 2 hereinafter), a second magazine 3 (referred to as a second fixed magazine 3 hereinafter), and a movable magazine 4; a magnetic tape drive 5 as a storing/reproducing device for reading/writing data from/to the magnetic tape by mounting the cartridge; a cartridge transporting device for transporting the cartridge by reciprocating between each cell of the magazines 2, 3, 4 and the magnetic tape drive 5; a control unit 7 for controlling each part of the magnetic-tape library device 1; and a power supply part 8.

Figure 2:
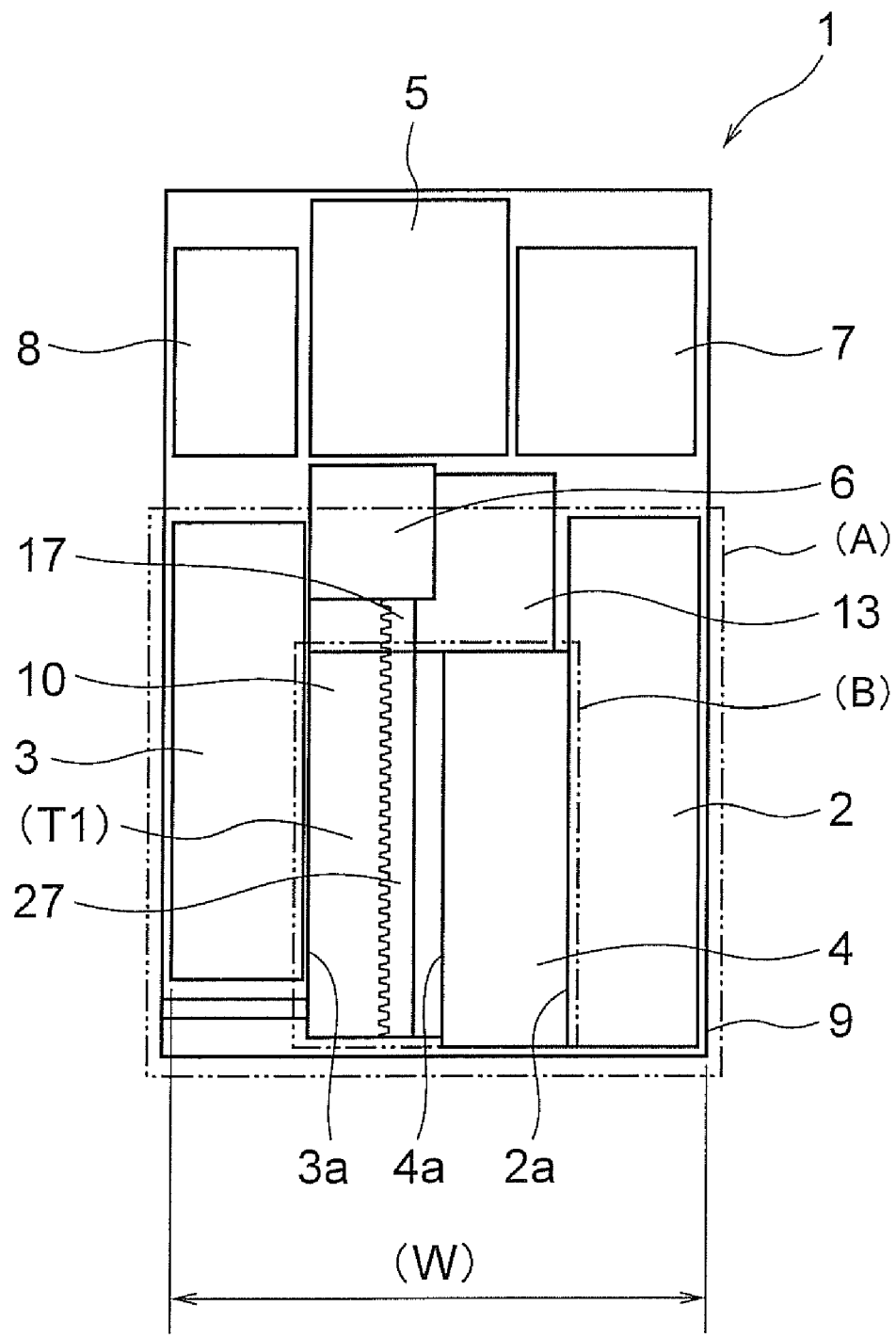
FIG. 2 is a plan view showing simplified layout of each part of the magnetic-tape library device according to the first exemplary embodiment.

The first fixed magazine 2 includes eight cells arranged in two rows and four columns, for example, and cartridge loading/unloading ports of each cell are provided on the left-end face side of the first fixed magazine 2 shown in FIG. 1 and FIG. 2. That is, the cartridge loading/unloading face of the first fixed magazine 2 is provided on its left-end face. Hereinafter, this position is referred to as a cartridge loading/unloading face 2a of the first fixed magazine 2.

The second fixed magazine 3 includes eight cells arranged in two rows and four columns, for example, and cartridge loading/unloading ports of each cell are provided on the right-end face side of the second fixed magazine 3 shown in FIG. 1 and FIG. 2. That is, the cartridge loading/unloading face of the second fixed magazine 3 is provided on its right-end face. Hereinafter, this position is referred to as a cartridge loading/unloading face 3a of the second fixed magazine 3.

Further, the movable magazine 4 includes six cells arranged in two rows and three columns, for example, and cartridge loading/unloading ports of each cell are provided on the left-end face side of the movable magazine 4 shown in FIG. 1 and FIG. 2. That is, the cartridge loading/unloading face of the movable magazine 4 is provided on its left-end face. Hereinafter, this position is referred to as a cartridge loading/unloading face 4a of the movable magazine 4.

Among the three magazines 2, 3, and 4, as shown in FIG. 2, the first fixed magazine 2 is fixedly set at the right-end part of a lateral-width direction of a magazine arranging area (A) on a base plate 9 that has a lateral width (W) which equals to a size obtained by adding the lateral width of the cartridge transporting device 6 to the sum of the lateral widths of each of the magazines 2, 3, 4 in a direction orthogonal to the respective cartridge loading/unloading faces 2a, 3a, 4a, with a prescribed gap (D) provided therebetween in the vertical direction as in FIG. 2. Further, as shown in FIG. 2, the second fixed magazine 3 is also fixedly set at the left-end part of the lateral-width direction of the magazine arranging area (A) with the prescribed gap (D) provided therebetween in the vertical direction in such a manner that the cartridge loading/unloading face 3a of the second magazine 3 becomes in parallel to the cartridge loading/unloading face 2a of the first fixed magazine 2. In this exemplary embodiment, the lateral width of each of the magazines 2, 3, and 4 is almost the same as the lateral width of the cartridge transporting device 6.

Meanwhile, the movable magazine 4 positioned between the first fixed magazine 2 and the second fixed magazine 3 include, in its bottom face, an integrally-formed magazine plate 10 in a thickness of less than the gap (D), which is extended out on both sides of the movable magazine 4 along the lateral-width direction of the magazine providing area (A). Thus, the structure of the movable magazine 4 is different from those of the first fixed magazine 2 and the second fixed magazine 3.

Figure 3:
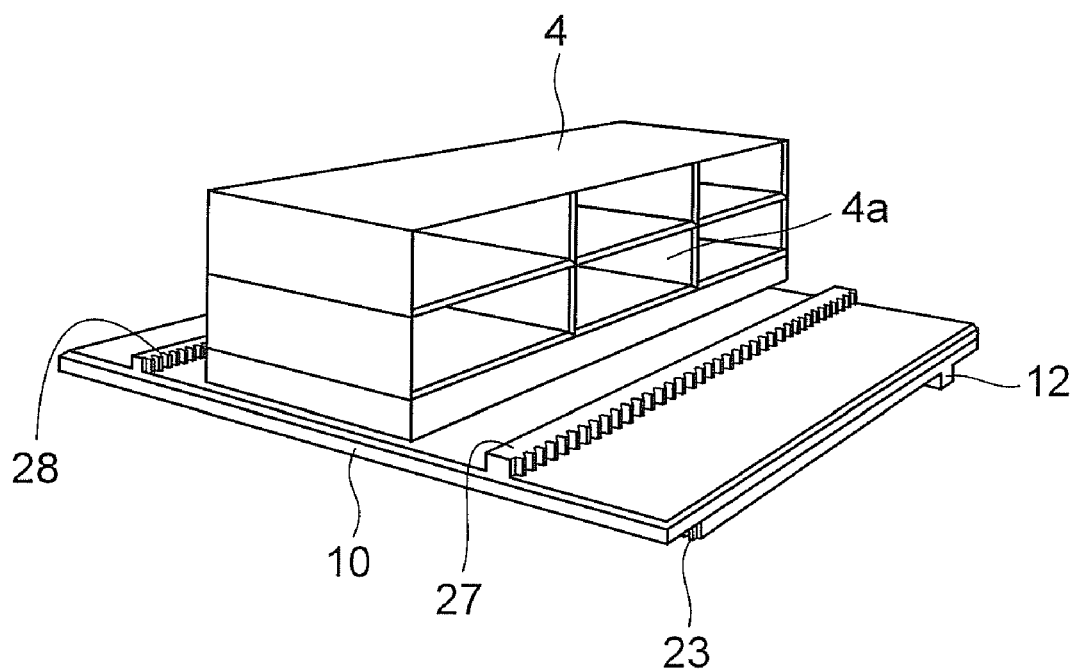
FIG. 3 is a perspective view showing structures of movable magazines and a magazine plate of the magnetic-tape library device according to the first exemplary embodiment.

FIG. 3 shows structures of the movable magazine 4 and the magazine plate 10.

The magazine plate 10 has a protruded strip 12 to be fitted with a rectangular groove 11 formed along the lateral-width direction of the magazine providing area (A) as in FIG. 1. The magazine plate 10 is loaded on the base plate 9 by having the protruded strip 12 engaged with the rectangular groove 11 so as to be attached to the base plate 9 to be capable of individually moving along the lateral-width direction of the magazine providing area (A) while keeping the cartridge loading/unloading face 4a of the movable magazine 4 to be in parallel to the cartridge loading/unloading face 2a of the first fixed magazine 2 and the cartridge loading/unloading face 3a of the second fixed magazine 3.

In this exemplary embodiment, as described above, there are two rows and four columns of cells provided for the first fixed magazine 2 and the second fixed magazine 3 located at both ends of the lateral-width direction of the magazine arranging area (A) of the base plate 9, and there are two rows and three columns of cells provided for the movable magazine 4 that is located between those magazines 2 and 3. That is, as shown in FIG. 2, the length of the movable magazine 4 in the direction orthogonal to the lateral-width direction of the magazine arranging area (A) along the plane of the magazine arranging area (A) is shorter than the lengths of the first fixed magazine 2 and the second fixed magazine 3. The length that is the sum of the length of the cartridge transporting device 6 in the direction orthogonal to the lateral-width direction along the plane of the magazine arranging area (A) and the length of the movable magazine 4 roughly equals to the length of the first fixed magazine 2 and the length of the second fixed magazine 3 located at both ends in the lateral-width direction of the magazine arranging area (A).

The cartridge transporting device 6 is attached on the base plate 9 at a position offset from a magazine movable area (B), in which movements of the movable magazine 4 in the lateral-width direction is allowed among the magazine arranging area (A) of the base plate 9, towards the outer side in the lateral-width direction of the magazine arranging area (A) along the plane of the magazine arranging area (A), i.e., towards the outer side in the direction orthogonal to the moving direction of the movable magazine 4. That is, the cartridge transporting device 6 is attached on the base plate 9 at a position that does not interfere with the magazine movable area (B) via a laterally-moving plate 13 that is provided at a position offset towards the rear side with respect to the movable magazine 4 in FIG. 1.

Figure 4:
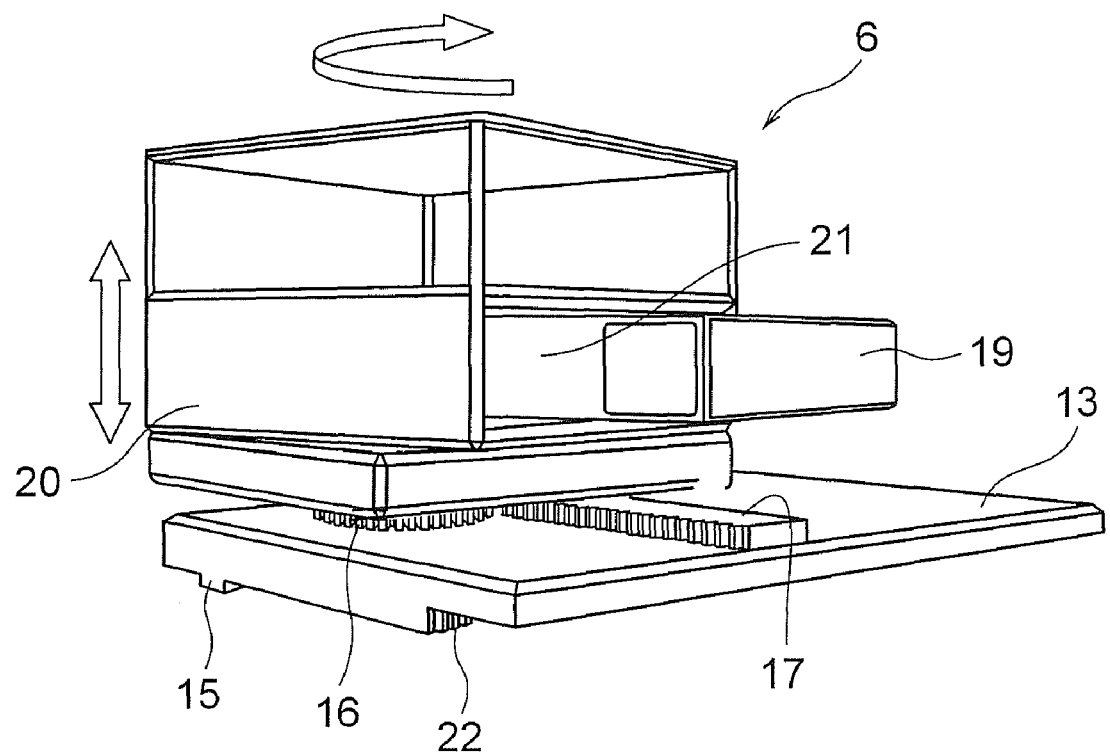
FIG. 4 is a perspective view showing structures of a cartridge transporting device and a laterally-moving plate of the magnetic-tape library device according to the first exemplary embodiment.

FIG. 4 shows the structures of the cartridge transporting device 6 and the laterally-moving plate 13.

The laterally-moving plate 13 has a protruded strip 15 on its bottom face to be engaged with a rectangular groove 14 formed on the base plate 9 along the lateral-width direction of the magazine providing area (A) as in FIG. 1. The laterally-moving plate 13 is loaded on the base plate 9 by having the protruded strip 15 engaged with the rectangular groove 14 so as to be capable of individually moving along a lateral moving path extended along the lateral-width direction of the magazine providing area (A).

The cartridge transporting device 6 includes a longitudinal-feeding pinion 16 protruded on the bottom face of the cartridge transporting device 6, and a longitudinal-feeding pinion driving motor My (not shown in FIG. 4) for rotationally driving the longitudinal-feeding pinion 16. The cartridge transporting device 6 is attached on the laterally-moving plate 13 in a state where the relative movement in the lateral-width direction with respect to the laterally-moving plate 13 is restricted by having the longitudinal-feeding pinion 16 fitted with a transporting device retraction rack 17 that is fixedly provided on the laterally-moving plate 13 towards the direction orthogonal to the lateral-width direction of the magazine arranging area (A), while the movement in the length direction of the transporting device retraction rack 17, i.e., movement along the direction orthogonal to the lateral-width direction of the magazine arranging area (A) is tolerated.

Figure 5:
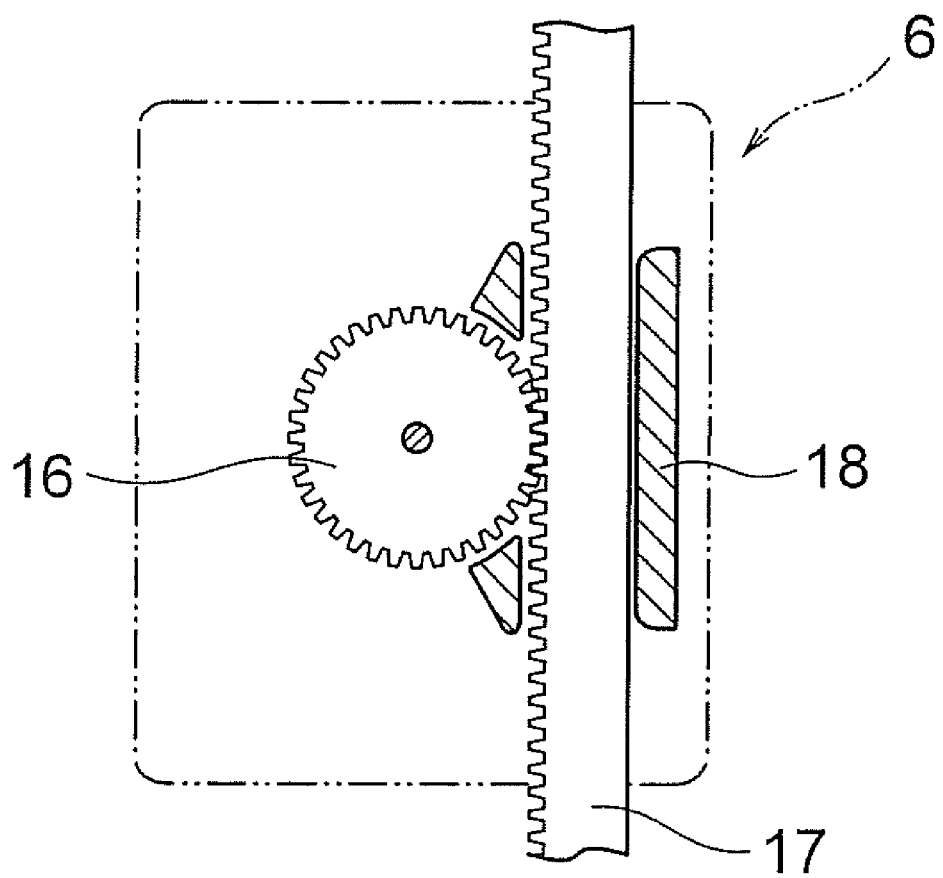
FIG. 5 is an illustration showing a guide piece provided on a bottom face of the cartridge transporting device of the magnetic-tape library device according to the first exemplary embodiment.

Specifically, as shown in FIG. 5, a guide piece 18 that is slidably in contact with a straight part in the back face of the transporting device retraction rack 17 is fixedly provided on the bottom-face side of the cartridge transporting device 6 so as to form a structure where the transporting device retraction rack 17 is sandwiched between the guide piece 18 and the longitudinal-feeding pinion 16. With this, relative movements of the cartridge transporting device 6 in the lateral-width direction with respect to the laterally-moving plate 13 is restricted and, at the same time, movements of the cartridge transporting device 6 along the length direction of the transporting device retraction rack 17 is tolerated. The sectional shape of the transporting device retraction rack 17 as a whole is in a formicary form. Thus, fall of the cartridge transporting device 6 from the transporting device retraction rack 17 is prevented by sandwiching the transporting device retraction rack 17 with the formicary-form guide piece 18 from both sides.

The cartridge transporting device 6 has a function of rotating a cartridge housing container 20 part at a pitch of 90 degrees to direct a cartridge loading/unloading port 21 of the housing container 20 towards various directions, since it is necessary to pass and receive a cartridge 19 between the cartridge loading/unloading ports of each cell of the magazines 2, 3, 4 and the cartridge loading/unloading port of the magnetic tape drive 5.

Further, the cartridge transporting device 6 has a function of aligning the cartridge loading/unloading port 21 of the housing container 20 to the height of each cell of the respective magazines 2, 3, 4 and the magnetic tape drive 5 by vertically moving the cartridge housing container 20 part. Furthermore, the cartridge transporting device 6 has a function of extracting the cartridge 19 from the cartridge loading/unloading port of the each cell of the respective magazines 2, 3, 4 and the magnetic tape drive 5 and housing it into the housing container 20, and a function of inserting the cartridge 19 within the housing container 20 to the cartridge loading/unloading port of the each cell of the respective magazines 2, 3, 4 and the magnetic tape drive 5.

The functions of the cartridge transporting device 6 in the field of the magnetic-tape library device and the cartridge transporting device are already well-known, so that detailed explanations thereof are omitted.

FIG. 4 shows a state where the cartridge loading/unloading port 21 of the cartridge housing container 20 is facing towards the front side. When the cartridge housing container 20 is rotated by 90 degrees from this state, it becomes possible to give and receive the cartridge 19 between the second fixed magazine 3 and each cell. Further, when the cartridge housing container 20 is rotated by 90 degrees from this state in an inverse direction, it becomes possible to pass and receive the cartridge 19 between the movable magazine 4 and each cell.

This function is a so-called bidirectional loading/unloading function (a function of passing and receiving the cartridge with each cell of the magazines neighboring to the cartridge transporting device 6 on both sides in the lateral-width direction).

Here, a motor as a driving source for rotating the cartridge housing container 20 is referred to as a container rotating motor Mr, and a motor as a driving source for vertically moving the cartridge housing container 20 is referred to as a container up/down motor Mz.

As shown in FIG. 2, the laterally-moving plate 13 to which the cartridge transporting device 6 is attached and the magazine plate 10 to which the movable magazine 4 is fixedly provided are arranged to be neighboring to each other in such a manner that the laterally-moving plate 13 is offset from the magazine plate 10 towards the outer side in the direction that is orthogonal to the lateral-width direction of the magazine arranging area (A). Further, a lateral-feeding rack 22 as in FIG. 4 is provided integrally with the laterally-moving plate 13 in a counter part of the magazine plate 10, and a lateral-feeding rack 23 as in FIG. 3 is provided integrally with the magazine plate 10 in a counter part of the laterally-moving plate 13.

Figure 6:
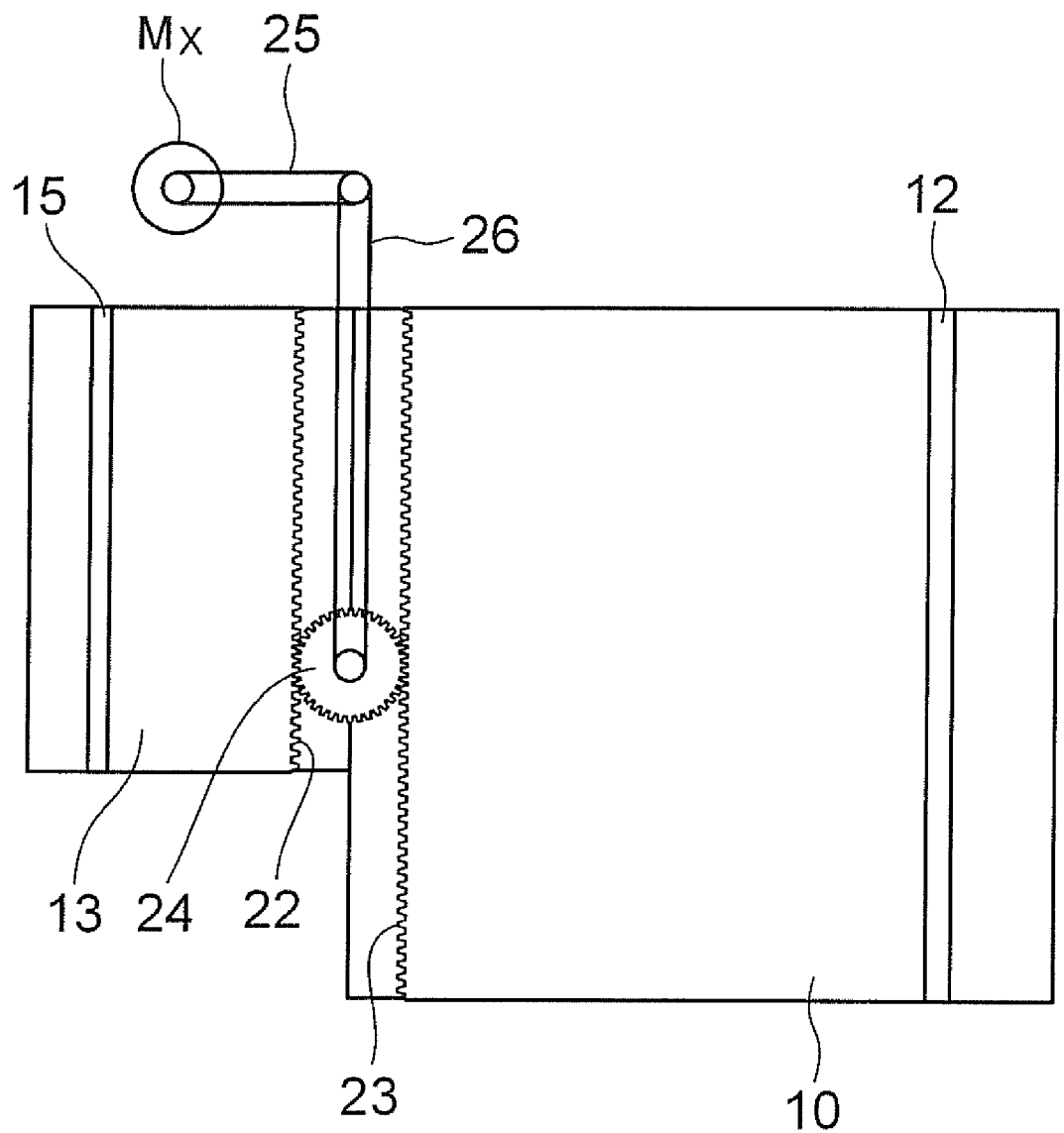
FIG. 6 is an illustration of the laterally-moving plate and the magazine plate of the magnetic-tape library device according to the first exemplary embodiment viewed from the back-face side.

FIG. 6 shows a state when the laterally-moving plate 13 and the magazine plate 10 are viewed from the back-face side.

As shown in FIG. 6, the lateral-feeding rack 22 of the laterally-moving plate 13 and the lateral-feeding rack 23 of the magazine plate 10 are fitted with a lateral-feeding pinion 24 from the mutually opposing directions by sandwiching the lateral-feeding pinion 24 that is provided by being protruded from the base plate 9. Therefore, when the lateral-feeding pinion 24 is rotary driven, the magazine plate 10 and the laterally-moving plate 13 are moved towards the opposite directions from each other along the lateral-width direction of the magazine arranging area (A) shown in FIG. 2.

Figure 7:
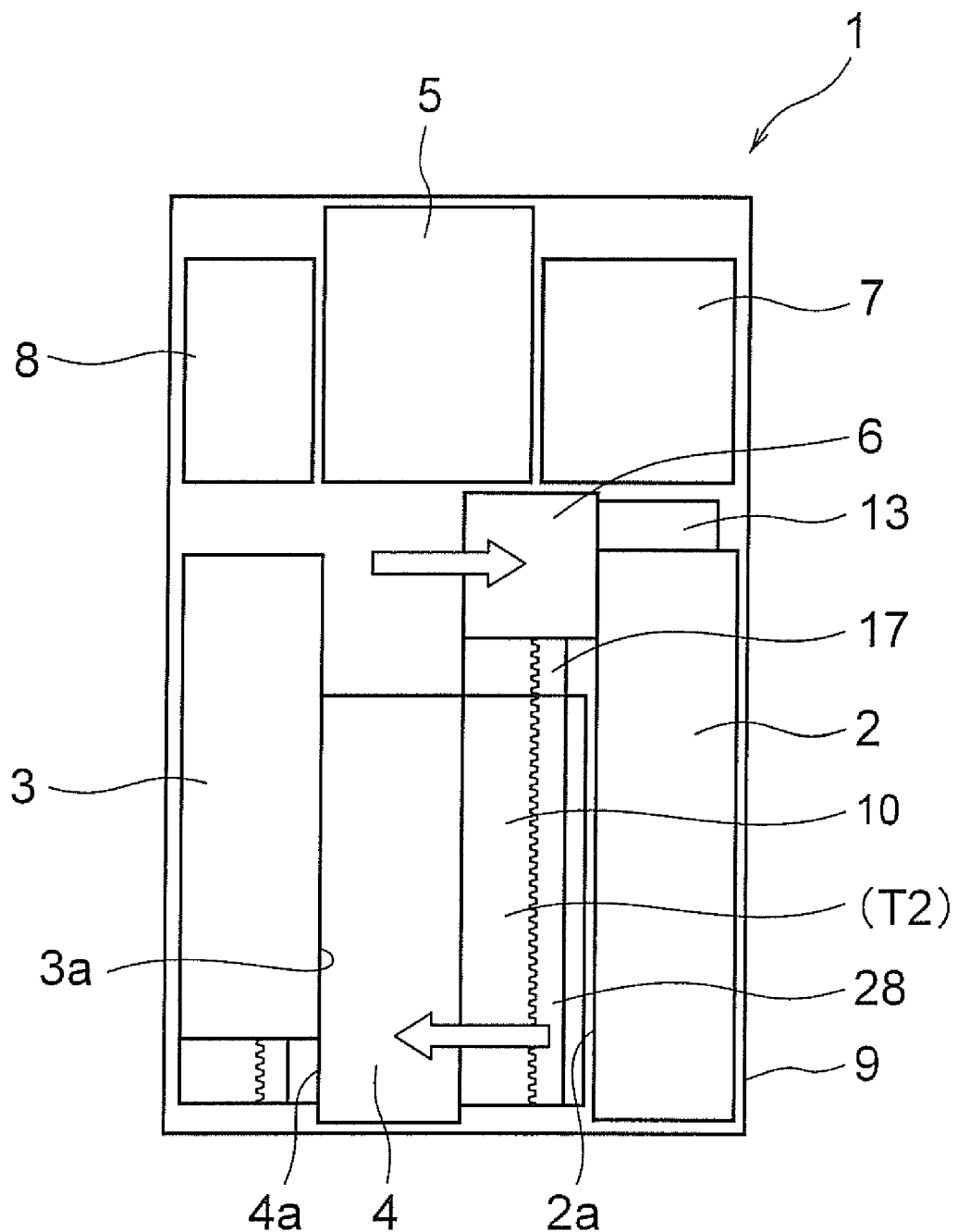
FIG. 7 is a plan view showing a state where the movable magazine and the cartridge transporting device of the magnetic-tape library device according to the first exemplary embodiment are moved to opposite directions to the movable limit of the lateral-width direction.

The number of teeth or the whole length of the lateral-feeding racks 22, 23, and the number of teeth and the diameter of the lateral-feeding pinion 24, as well as the fitted position between the lateral-feeding rack 22 and the lateral-feeding pinion 24 and the fitted position between the lateral-feeding rack 23 and the lateral-feeding pinion 24 are so designed that: the cartridge transporting device 6 comes at a position on an extended line of a first longitudinal-move path (T1) formed between the second fixed magazine 3 and the movable magazine 4, when the movable magazine 4 formed integrally with the magazine plate 10 is moved to the first fixed magazine 2 side as in FIG. 2; and the cartridge transporting device 6 comes at a position on an extended line of a second longitudinal-move path (T2) formed between the first fixed magazine 2 and the movable magazine 4, when the movable magazine 4 formed integrally with the magazine plate 10 is moved to the second fixed magazine 3 side as in FIG. 7.

Further, the lateral-feeding pinion 24 is to be rotationally driven via power transmitting belts 25, 26 as shown in FIG. 6 by having a lateral-feeding pinion driving motor Mx (not shown) which is built-in to the base plate 9.

On the magazine plate 10 to which the movable magazine 4 is fixedly provided, a first longitudinal-feeding rack 27 communicated with the transporting device retraction rack 17 of the laterally-moving plate 13 is integrally fixed as shown in FIG. 3 along the first longitudinal moving path (T1) shown in FIG. 2. At the same time, a second longitudinal-feeding rack 28 communicated with the transporting device retraction rack 17 of the laterally-moving plate 13 is integrally fixed as shown in FIG. 3 along the second longitudinal moving path (T2) shown in FIG. 7.

As shown in FIG. 2, the end part of the first longitudinal-feeding rack 27 is communicated with the transporting device retraction rack 17 of the laterally-moving plate 13 when the first longitudinal moving path (T1) is formed between the second fixed magazine 3 and the movable magazine 4 because the movable magazine 10 on the magazine plate 4 moves on the first fixed magazine 2 side. Further, as shown in FIG. 7, the end part of the second longitudinal-feeding rack 28 is communicated with the transporting device retraction rack 17 of the laterally-moving plate 13 when the second longitudinal moving path (T2) is formed between the first fixed magazine 2 and the movable magazine 4 because the movable magazine 4 on the magazine plate 10 moves on the second fixed magazine 3 side.

Therefore, in this exemplary embodiment, a magazine rearranging device for forming the longitudinal moving paths (T1) and (T2) between the mutually neighboring magazines 3 and 4 or between the mutually neighboring magazines 2 and 4 by moving the movable magazine 4 to the lateral-width direction of the magazine arranging area (A) is configured with: the lateral-feeding rack 23 of the magazine plate 10, which is directly associated with feeding of the magazine plate 10 in the lateral-width direction; the lateral-feeding pinion 24; the lateral-feeding pinion driving motor Mx for rotationally driving the lateral-feeding pinion 24; and the power transmitting belts 25 and 26 which transmit the rotary power of the lateral-feeding pinion driving motor Mx to the lateral-feeding pinion 24.

Further, a transporting-device longitudinal feeding device of this exemplary embodiment for applying feed to the cartridge transporting device 6 along the longitudinal moving paths (T1) and (T2) is configured with: the transporting device retraction rack 17 formed on the laterally-moving plate 13 to which the cartridge transporting device 6 is attached; the first longitudinal-feeding rack 27 on the magazine plate 10, which forms the first longitudinal moving path (T1) by being communicated with the transporting device retraction rack 17; the second longitudinal-feeding rack 28 on the magazine plate 10, which forms the second longitudinal moving path (T2) by being communicated with the transporting device retraction rack 17; the longitudinal-feeding pinion 16 for moving the cartridge transporting device 6 along the racks 17, 27, and 28; and the longitudinal-feeding pinion driving motor My as the driving source of the longitudinal-feeding pinion 16.

A transporting-device lateral feeding device which sets the position of the cartridge transporting device 6 at the ends of the first and second longitudinal moving paths (T1, T2) by applying feed to the cartridge transporting device 6 along the lateral moving path that is extended along the lateral-width direction of the magazine arranging area (A) at the position that is offset from the magazine moving area (B) towards the outer side, i.e., at the position that does not interfere with the magazine moving area (B), is configured with: the lateral-feeding rack 22 of the laterally-moving plate 13 that is required for moving the laterally-moving plate 13 to which the cartridge transporting device 6 is attached along the lateral moving path; the lateral-feeding pinion 24 which is engaged with the lateral-feeding rack 22; and the lateral-feeding pinion driving motor Mx for rotationally driving the lateral-feeding pinion 24.

As shown in FIG. 1 or FIG. 2, the magnetic tape drive 5 is fixedly provided on the base plate 9 to be able to pass and receive the cartridge 19 between the cartridge transporting device 6 and the magnetic tape drive 5 in a state where the cartridge transporting device 6 is located on the extended line of the first longitudinal moving path (T1), i.e., in a state where the cartridge transporting device 6 is moved to a stroke end on the left side of the lateral moving path.

Figure 8:
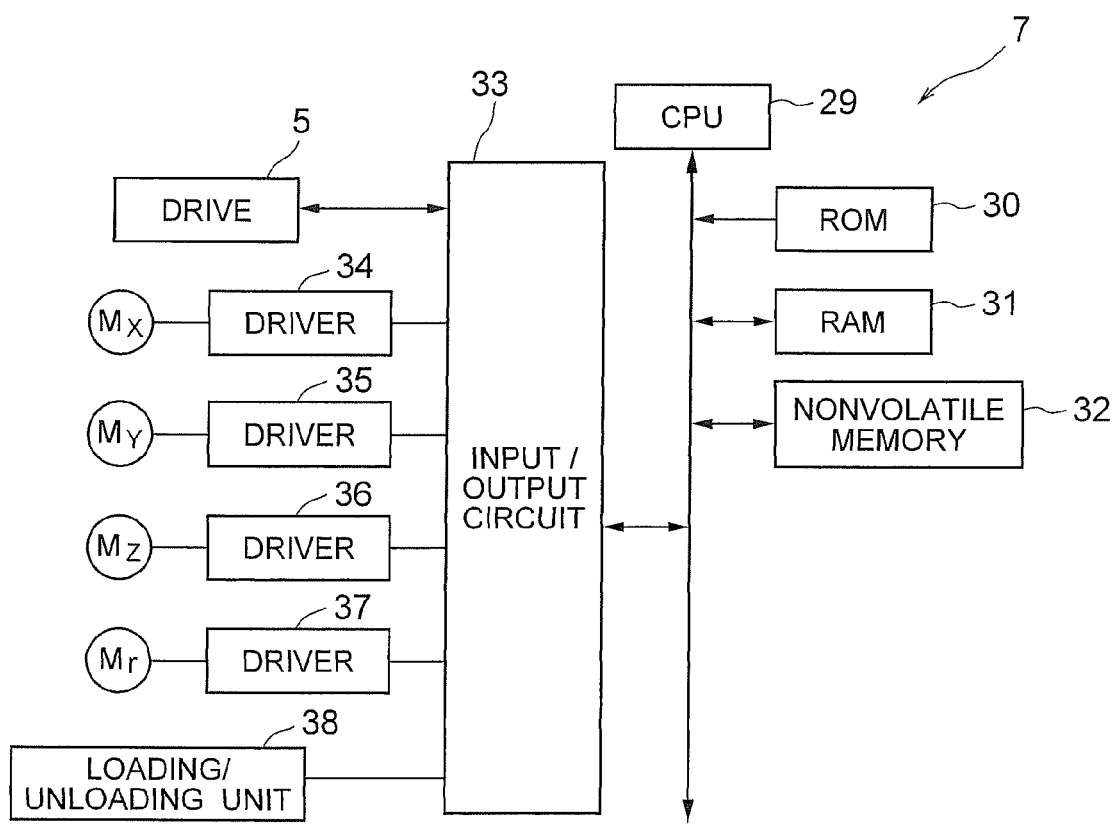
FIG. 8 is a block diagram showing a schematic structure of a control unit which controls each part of the magnetic-tape library device according to the first exemplary embodiment.

FIG. 8 is a block diagram showing a schematic structure of the control unit 7 which controls each part of the magnetic-tape library device 1.

As shown in FIG. 8, the control unit 7 of the magnetic-tape library device 1 includes: a CPU 29 used for arithmetic processing; a ROM 30 to which a control program of the CPU 29 is stored; a RAM 31 used for temporal storage and the like of data in a process of arithmetic operations; and a nonvolatile memory 32 for storing various parameters and the like. The control unit 7 is formed to drive-control the lateral-feeding pinion driving motor Mx, the longitudinal-feeding pinion driving motor My, the container up/down motor Mz, the container rotating motor Mr, and a loading/unloading unit 38 inside the cartridge housing container 20 via an input/output circuit 33 and drivers 34, 35, 36, 37. The loading/unloading unit 38 is for letting in and out the cartridge 19 when passing and receiving the cartridge 19 between the cartridge loading/unloading port of each cell of the respective magazines 2, 3, 4 as well as the cartridge loading/unloading port of the magnetic tape drive 5 and the cartridge housing container 20. Regarding this, there are various types that are already known, such as the one using a roller, the one sing a conveyer belt, the one using a picker, etc., so that explanations thereof are omitted herein.

The magnetic tape drive 5 is connected to a higher-order device such as a personal computer or a work station via an interface, not shown. The magnetic tape drive 5 reads/writes data from/to the magnetic tape within the cartridge by mounting the cartridge 19 of one of the cells of the magazines 2, 3, and 4 according to a mount instruction from the higher-order device.

The magnetic tape drive 5 is also connected to the CPU 29 of the control unit 7 via the input/output circuit 33. When a mount instruction from the higher-order device is detected by the magnetic tape drive 5, identification information for specifying the cartridge 19 to be mounted is sent to the CPU 29 from the magnetic tape drive 5.

Further, in this exemplary embodiment, the nonvolatile memory 32 stores: the second fixed magazine housing position storage table as in FIG. 12A in which the corresponding relation between each of the cells l(1, 1)-l(2, 4) in two rows and four columns of the second fixed magazine 3 and the identification information of the cartridges 19 housed in each of the cells l(1, 1)-l(2, 4) is stored; the movable magazine housing position storage table as in FIG. 12B in which the corresponding relation between each of the cells c(1, 1)-c(2, 3) in two rows and three columns of the movable magazine 4 and the identification information of the cartridges 19 housed in each of the cells c(1, 1)-c(2, 3) is stored; and the first fixed magazine housing position storage table as in FIG. 12C in which the corresponding relation between each of the cells r(1, 1)-r(2, 4) in two rows and four columns of the first fixed magazine 2 and the identification information of the cartridges 19 housed in each of the cells r(1, 1)-r(2, 4) is stored.

The second fixed magazine housing position storage table is the housing position storage table which stores the housing positions of the cartridges by corresponding to the cartridge loading/unloading face 3a of the second fixed magazine 3. The movable magazine housing position storage table is the housing position storage table which stores the housing positions of the cartridges by corresponding to the cartridge loading/unloading face 4a of the movable magazine 4. The first fixed magazine housing position storage table is the housing position storage table which stores the housing positions of the cartridges by corresponding to the cartridge loading/unloading face 2a of the first fixed magazine 2.

Further, a part of the storage area of the RAM 31 is utilized to generate a left-magazine cartridge position temporary storage table as in FIG. 13A for temporarily storing each cell of the magazine neighboring to the cartridge transporting device 6 on the left side in the directions shown in FIG. 1 or FIG. 2 and the identification information of the cartridges 19 housed in each cell, and to generate a right-magazine cartridge position temporary storage table as in FIG. 13B for temporarily storing each cell of the magazine neighboring to the cartridge transporting device 6 on the right side in the directions shown in FIG. 1 or FIG. 2 and the identification information of the cartridges 19 housed in each cell.

Figure 9:
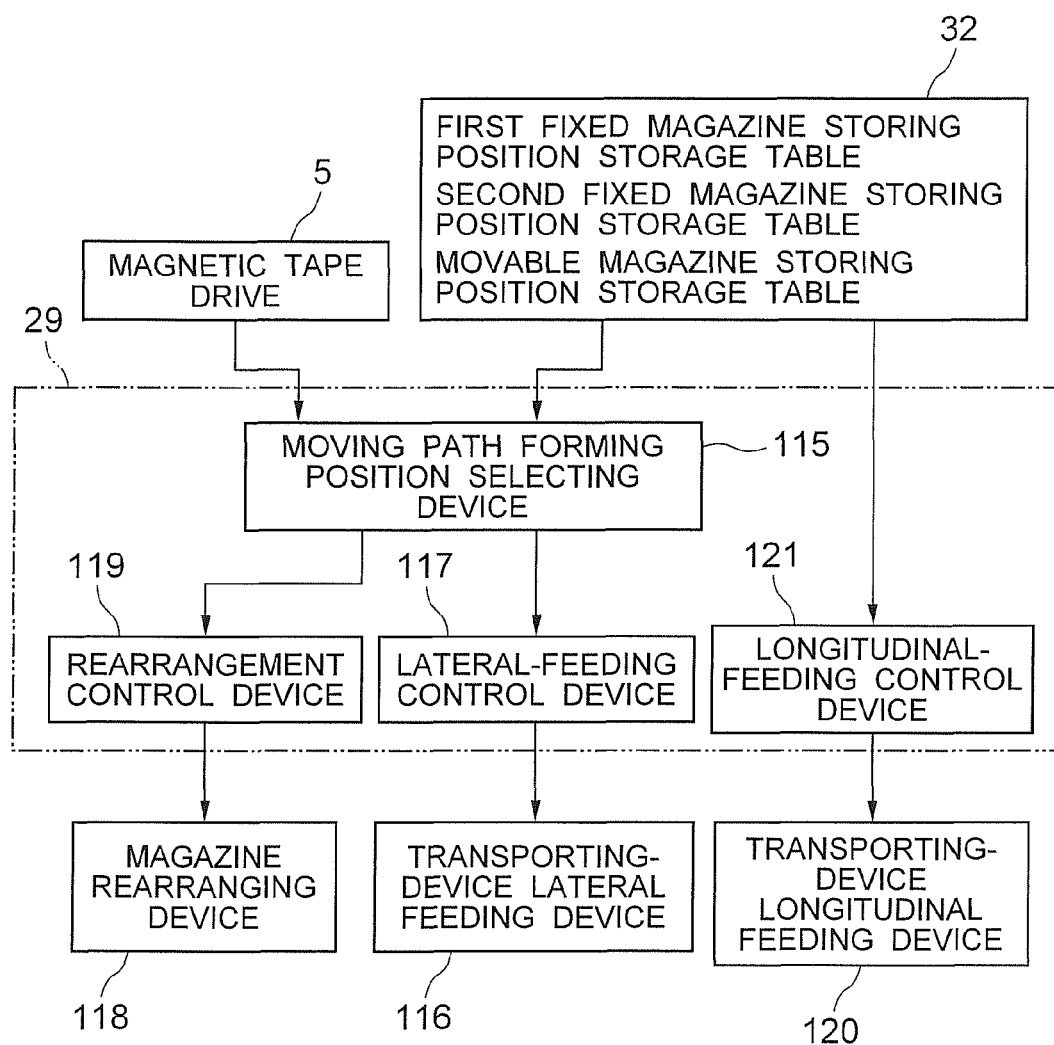
FIG. 9 is a functional block diagram which shows simplified functions achieved by a CPU that is provided to the control unit which controls each part of the magnetic-tape library device according to the first exemplary embodiment.

FIG. 9 is a functional block diagram showing the functions of the CPU 29 of FIG. 8 in a simplified manner.

In this exemplary embodiment, the CPU 29 of the control unit 7 functions as a moving-path forming position selecting device 115 which finds, from the nonvolatile memory 32, the cartridge loading/unloading face including the cell to which the mount-target cartridge is being housed or the cell to which unmount-target cell is to be housed according to the instruction from the magnetic tape drive 5 as the storing/reproducing device, and selects the position between the cartridge loading/unloading face and the magazine neighboring to the cartridge loading/unloading face as the forming position of the longitudinal moving path.

Further, the CPU 29 also functions as a lateral-feeding control device 117 which applies feed to the cartridge transporting device 6 to the end position of the longitudinal moving path that is selected by the moving-path forming position selecting device 115, through drive-controlling the lateral-feeding pinion driving motor Mx of the transporting-device lateral feeding device 116 that is configured with the lateral-feeding rack 22, the lateral-feeding pinion 24, and the lateral-feeding pinion driving motor Mx.

Furthermore, the CPU 29 functions as a rearrangement control device 119 which forms the longitudinal moving path that is selected by the moving-path forming position selecting device 115, through drive-controlling the lateral-feeding pinion driving motor Mx of a magazine rearranging device 118 that is configured with the lateral-feeding rack 23, the lateral-feeding pinion 24, the lateral-feeding pinion driving motor Mx, and the power transmitting belts 25, 26.

Moreover, the CPU 29 also functions as a longitudinal-feeding control device 121 which sets the position of the cartridge transporting device 6 at the position of the cell to which the mount-target is being housed or the cell to which the unmounted cartridge is to be housed, through drive-controlling the longitudinal-feeding pinion driving motor My of a transporting-device longitudinal feeding device 120 that is configured with the transporting device retraction rack 17, the first and second longitudinal-feeding racks 27, 28, the longitudinal-feeding pinion 16, and the longitudinal-feeding pinion driving motor My based on the corresponding relations between the cell positions and the cartridges stored in the first fixed magazine housing position storage table, the second magazine housing position storage table, and the movable magazine housing position storage table in the nonvolatile housing memory 32.

Figure 10:
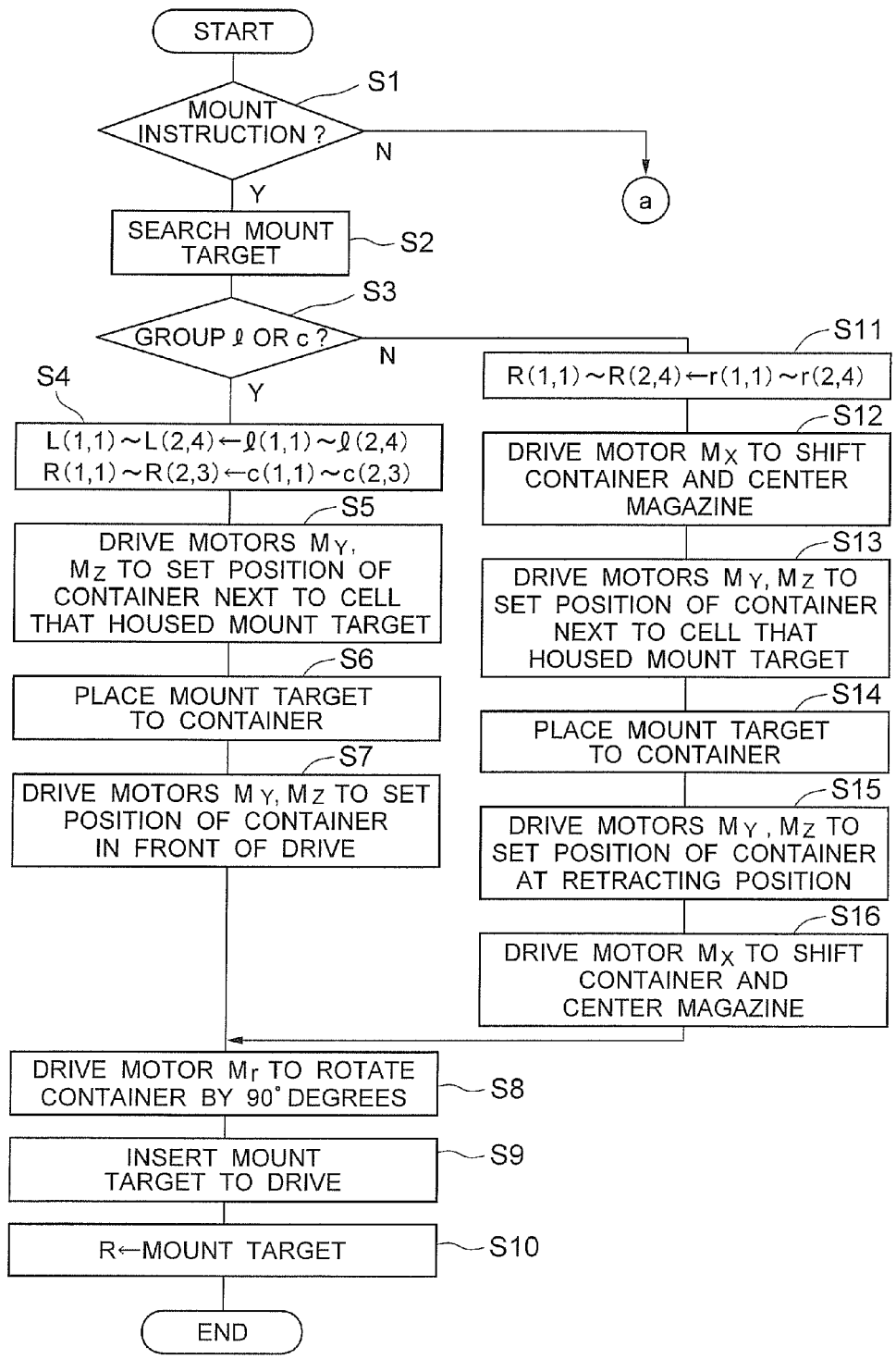
FIG. 10 is a flowchart showing simplified outline of drive controls of each part executed by the CPU that is provided to the control unit of the magnetic-tape library device according to the first exemplary embodiment.
Figure 11:
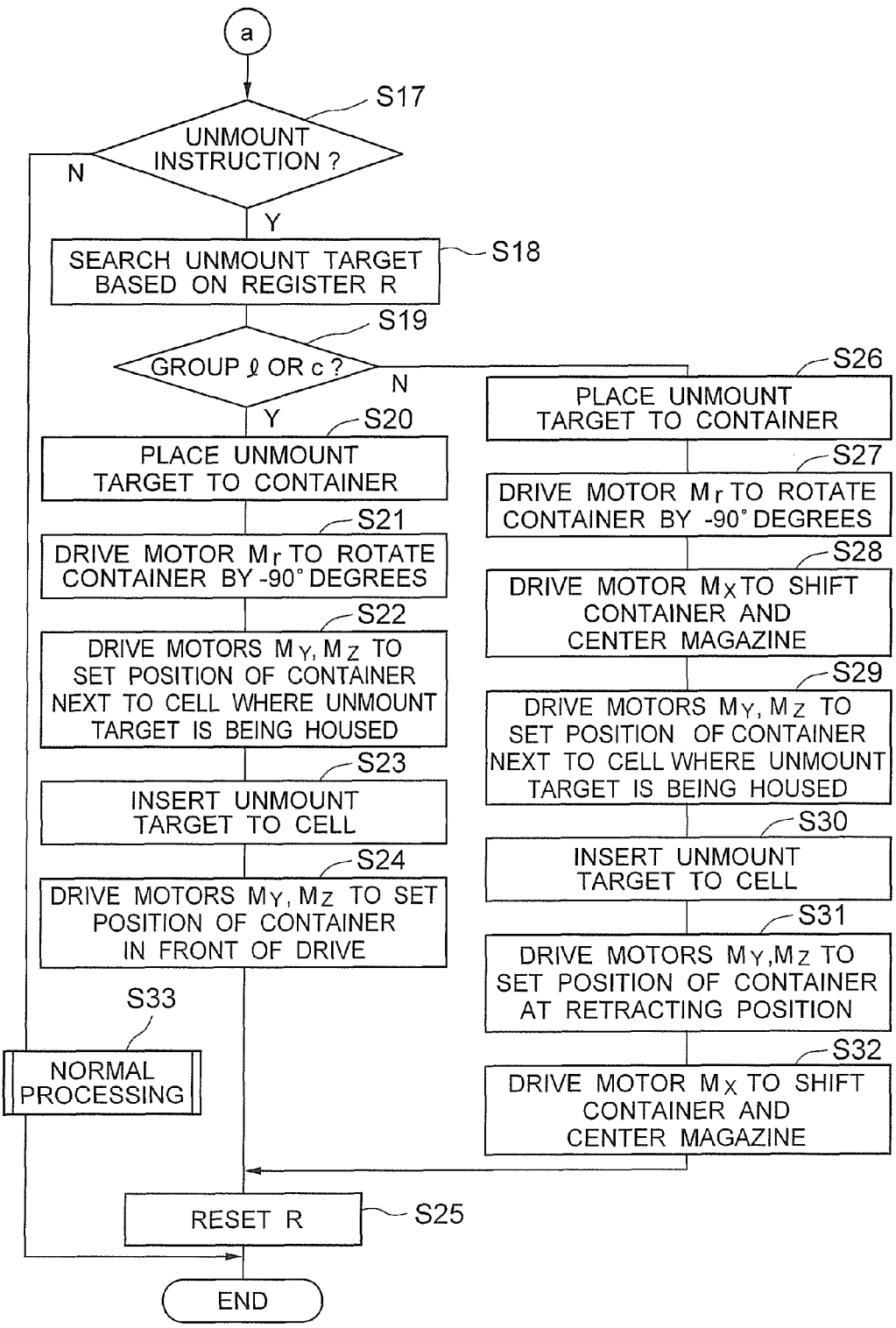
FIG. 11 is a successive flowchart showing simplified outline of drive controls of each part executed by the CPU that is provided to the control unit of the magnetic-tape library device according to the first exemplary embodiment.

FIG. 10 and FIG. 11 are flowcharts showing simplified outlines regarding drive-controls of each part of the magnetic-tape library device 1 executed by the CPU 29 that is provided to the control unit 7 of this exemplary embodiment.

As an exemplary advantage according to the storage medium library device of the present invention, it is unnecessary to provide a permanent longitudinal moving path between each of the magazines, even when a plurality of magazines are provided. This makes it possible to house a great number of cartridges by effectively utilizing the space for forming the moving paths that are required for the cartridge transporting device to move.

Next, processing of the CPU 29 functioning as the moving-path forming position selecting device 115, the lateral-feeding control device 117, the rearrangement control device 119, and the longitudinal-feeding control device 121, the overall processing operations of the magnetic-tape library device 1, and an exemplary embodiment of a cartridge transporting method of a storage medium library device to which the present invention is applied will be described in a concretive manner by referring to FIG. 10 and FIG. 11.

However, as shown in FIG. 1 or FIG. 2, the state where the movable magazine 4 on the magazine plate 10 is on the first fixed magazine 2 side so that the first longitudinal moving path (T1) is formed between the second fixed magazine 3 and the movable magazine 4, and the cartridge transporting device 6 is located on the extended line of the first longitudinal moving path (T1) is the initial state of the movable magazine 4 and the cartridge transporting device 6. In this state, the cartridge housing container 20 of the cartridge transporting device 6 is to face such direction that it is possible to pass and receive the cartridge on both sides of the lateral-width direction of the cartridge transporting device 6, i.e., in the left and right direction of FIG. 2.

When a mount instruction from the higher-order device such as the personal computer or the work station is inputted to the magnetic tape drive 5, the mount instruction is inputted to the CPU 29 of the control unit 7 from the magnetic tape drive 5 via the input/output circuit 33. As described above, this mount instruction contains identification information for specifying the cartridge 19 to be mounted.

The CPU 29 repeatedly executes judging processing (step s1, step s17) to check whether or not there is an input of a mount instruction and an input of an unmount instruction, and regular processing (step s33) for checking errors and the like of each part by every prescribed period. The input of the mount instruction is detected by the CPU 29 with the judging processing of step s1.

When the input of the mount instruction is detected in the judging processing of step s1, the CPU 29 functioning as the moving-path forming position selecting device 115 first searches the housing position storage tables as in FIG. 12A, FIG. 12B, and FIG. 12C based on the identification information inputted along with the mount instruction (step s2) so as to judge whether the cartridge loading/unloading face of the cell to which the cartridge 19 having the identification information designated as the mount target belongs to the cartridge loading/unloading face 3a of the second fixed magazine 3, the cartridge loading/unloading face 4a of the movable magazine 4, or the cartridge loading/unloading face 2a of the first fixed magazine 2 (step s3).

For example, when the identification information inputted along with the mount instruction is "F", the judgment result in step s3 becomes true since the cartridge 19 having the identification information "F" designated as the mount target is stored in the housing position storage table which stores the cartridge housing positions by corresponding to the cartridge loading/unloading face 3a of the second fixed magazine 3 as shown in FIG. 12A. Further, when the identification information inputted along with the mount instruction is "W", for example, the judgment result in step s3 becomes false since the cartridge 19 having the identification information "W" designated as the mount target is stored in the housing position storage table which stores the cartridge housing positions by corresponding to the cartridge loading/unloading face 2a of the first fixed magazine 2 as shown in FIG. 12C.

When the judgment result in step s3 is true, i.e., when it is found that the cartridge 19 having the identification information designated as the mount target belongs to the cartridge loading/unloading face 3a of the second fixed magazine 3 or the cartridge loading/unloading face 4a of the movable magazine 4, the CPU 29 functioning as the moving-path forming position selecting device 115 selects the longitudinal moving path between the cartridge loading/unloading face 3a of the second fixed magazine 3 and the moving magazine 4 neighboring to the cartridge loading/unloading face 3a or the longitudinal moving path between the cartridge loading/unloading face 4a of the movable magazine 4 and the second fixed magazine 3 neighboring to the cartridge loading/unloading face 4a (no matter which paths), i.e., the first longitudinal moving path (T1), as the longitudinal moving path forming position.

When the first longitudinal moving path (T1) is selected as the longitudinal-moving path forming position, the CPU 29 temporarily stores the information in the second fixed magazine housing position storage table shown in FIG. 12A to the left-magazine cartridge position temporary storage table as in FIG. 13A, while temporarily storing the information in the movable magazine housing position storage table shown in FIG. 12B to the right-magazine cartridge position temporary storage table as in FIG. 13B. At the same time, the CPU 29 updates the contents of the left-magazine cartridge position temporary storage table to the contents as in FIG. 14A, while updating the contents of the right-magazine cartridge position temporary storage table to the contents as in FIG. 14B (step s4).

Through this operation, the corresponding relation between the cell position and the identification information of the cartridge that can be extracted from the cartridge loading/unloading face of the cell of the magazine located on the left side when the cartridge transporting device 6 moves along the longitudinal moving path selected by the CPU 29 that is functioning as the moving-path forming position selecting device 115 is temporarily stored to the left-magazine cartridge position temporary storage table. Further, the corresponding relation between the cell position and the identification information of the cartridge that can be extracted from the cartridge loading/unloading face of the cell of the magazine located on the right side of the cartridge transporting device 6 is temporarily stored to the right-magazine cartridge position temporary storage table.

As described above, when the CPU 29 functioning as the moving-path forming position selecting device 115 selects the first longitudinal moving path (T1) that is the longitudinal moving path between the cartridge loading/unloading face 3a of the second fixed magazine 3 and the moving magazine 4 neighboring to the cartridge loading/unloading face 3a or the longitudinal moving path between the cartridge loading/unloading face 4a of the movable magazine 4 and the second fixed magazine 3 neighboring to the cartridge loading/unloading face 4a as the longitudinal moving path forming position, the cartridge 19 having the identification information designated as the mount target can be extracted by moving the cartridge transporting device 6 along the first longitudinal moving path (T1) while keeping the initial state as in FIG. 2. Therefore, it is unnecessary to form a longitudinal moving path anew by operating the rearrangement control device 119 and the magazine rearranging device 118 or to set the position on the longitudinal moving path by operating the transporting-device lateral feeding device 116 and the lateral-feeding control device 117.

Therefore, in this case, the CPU 29 functioning as the longitudinal-feeding control device 121 finds the cell position to which the cartridge 19 having the identification information designated as the mount target is housed by referring to the information in the left-magazine cartridge position temporary storage table shown in FIG. 14A and the information in the right-magazine cartridge position temporary storage table shown in FIG. 14B.

Then, the CPU 29 functioning as the longitudinal-feeding control device 121 rotates the longitudinal-feeding pinion 16 by drive-controlling the longitudinal-feeding pinion driving motor My that configures a part of the transporting-device longitudinal feeding device 120 so as to move the cartridge transporting device 6 along the first longitudinal moving path (T1), more specifically, along the transporting device retraction rack 17 on the laterally-moving plate 13 and the first longitudinal-feeding rack 27 on the magazine plate 10 to set the position of the cartridge transporting device 6 at the position of the column of the cell to which the cartridge 19 having the designated identification information is housed (position along the back-to-front direction in FIG. 1).

Furthermore, the CPU 29 drive-controls the container up/down motor Mz of the cartridge transporting device 6 to move the cartridge housing container 20 in the vertical direction so as to align the height of the cartridge loading/unloading port 21 of the cartridge housing container 20 with the position of the row of the cell to which the cartridge 19 having the designated identification information is housed (position along the height direction in FIG. 1) (step s5).

The longitudinal-feeding control device 121 actually refers in the processing of step s5 to find the cell position is the information in the left-magazine cartridge position temporary storage table shown in FIG. 14A and the information in the right-magazine cartridge position temporary storage table shown in FIG. 14B. However, contents thereof are the same as those in the second fixed magazine housing position storage table shown in FIG. 12A and the movable magazine housing position storage table shown in FIG. 12B. Thus, it can also be said that the longitudinal-feeding control device 121 refers to the housing position storage tables for finding the cell position.

As described above, in this state, the cartridge transporting device 6 is in the initial state and the cartridge housing container 20 is facing the direction with which the cartridge can be passed and received in both sides of the cartridge transporting device 6 in the lateral-width direction, i.e., in the left and right directions of FIG. 1. Thus, the CPU 29 drive-controls the loading/unloading unit 38 within the cartridge housing container 20 depending on whether the cartridge loading/unloading face of the cell to which the cartridge 19 having the identification information designated as the mount target is housed belongs to the cartridge loading/unloading face 3a of the second fixed magazine 3 or belongs to the cartridge loading/unloading face 4a of the movable magazine 4, and places the cartridge 19 having the identification information designated as the mount target into the cartridge housing container 20 (step s6).

Then, the CPU 29 rotates the longitudinal-feeding pinion 16 by drive-controlling the longitudinal-feeding pinion driving motor My that configures a part of the transporting-device longitudinal feeding device 120 so as to move the cartridge transporting device 6 on the first longitudinal moving path (T1), more specifically, along the transporting device retraction rack 17 on the laterally-moving plate 13 and the first longitudinal-feeding rack 27 on the magazine plate 10 to set the position of the cartridge transporting device 6 at the position in front of the magnetic tape drive 5. Further, the CPU 29 drive-controls the container up/down motor Mz of the cartridge transporting device 6 to move the cartridge housing container 20 in the vertical direction so as to align the height of the cartridge loading/unloading port 21 of the cartridge housing container 20 with the height of the cartridge loading/unloading port of the magnetic tape drive 5 (step s7).

Then, the CPU 29 rotates the cartridge housing container 20 by drive-controlling the container rotating motor Mr by 90 degrees to align the facing direction of the cartridge loading/unloading port 21 of the cartridge housing container 20 with the facing direction of the cartridge loading/unloading port of the magnetic tape drive 5 (step s8), mounts the cartridge 19 having the identification information designated as the mount target by inserting it to the cartridge loading/unloading port of the magnetic tape drive 5 (step s9), and temporarily stores the identification information of the mounted cartridge 19 to an identification information storing register R of the RAM 31 (step s10).

In the meantime, when the judgment result in step s3 is false, i.e., when it is found that the cartridge 19 having the identification information designated as the mount target belongs to the cartridge loading/unloading face 2a of the first fixed magazine 2, the CPU 29 functioning as the moving-path forming position selecting device 115 selects the longitudinal moving path between the cartridge loading/unloading face 2a of the first fixed magazine 2 and the moving magazine 4 neighboring to the cartridge loading/unloading face 2a, i.e., the second longitudinal moving path (T2), as the longitudinal moving path forming position.

When the second longitudinal moving path (T2) is selected as the longitudinal-moving path forming position, the CPU 29 temporarily stores the information in the first fixed magazine housing position storage table shown in FIG. 12C to the right-magazine cartridge position temporary storage table as in FIG. 13B, and updates the contents of the right-magazine cartridge position temporary storage table to the contents as in FIG. 15B (step s11)

Through this operation, the corresponding relation between the cell position and the identification information of the cartridge that can be extracted from the cartridge loading/unloading face of the cell of the magazine located on the right side when the cartridge transporting device 6 moves along the longitudinal moving path selected by the CPU 29 that is functioning as the moving-path forming position selecting device 115 is temporarily stored to the right-magazine cartridge position temporary storage table.

As described above, when the CPU 29 functioning as the moving-path forming position selecting device 115 selects the second longitudinal moving path (T2) that is the longitudinal moving path between the cartridge loading/unloading face 2a of the first fixed magazine 2 and the moving magazine 4 neighboring to the cartridge loading/unloading face 2a, the cartridge transporting device 6 cannot be moved along the selected longitudinal moving path, i.e., along the second longitudinal moving path (T2), when the initial state as in FIG. 2 is being maintained.

Thus, the CPU 29 functioning as the lateral-feeding control device 117 and the rearrangement control device 119 drive-controls the lateral-feeding pinion driving motor Mx that configures a part of the transporting-device lateral feeding device 116 and the magazine rearranging device 118 to rotate the lateral-feeding pinion 24 that configures a part of the transporting-device lateral feeding device 116 and the magazine rearranging device 118 in a counterclockwise direction of FIG. 6, i.e., in a clockwise direction of FIG. 2, so as to apply feed to the lateral-feeding rack 22 of the laterally-moving plate 13 on which the cartridge transporting device 6 is loaded towards the right direction in FIG. 2 along the lateral moving path that is offset from the magazine moving area (B) towards the outer side.

At the same time, by utilizing the rotating action of the lateral-feeding pinion 24, the CPU 29 functioning as the lateral-feeding control device 117 and the rearrangement control device 119 applies feed to the lateral-feeding rack 23 of the magazine plate 10 to which the movable magazine 4 is fixedly provided towards the left direction in FIG. 2 along the lateral-width direction of the magazine arranging area (A).

By utilizing the two feeding actions associated with the rotating action of the lateral-feeding pinion 24 in this manner, the CPU 29 functioning as the lateral-feeding control device 117 and the rearrangement control device 119 moves the movable magazine 4 on the magazine plate 10 to the second fixed magazine 3 side as in FIG. 7 to form the second longitudinal moving path (T2) having the width that equals to the lateral width of the cartridge transporting device 6 between the cartridge loading/unloading face 2a of the first fixed magazine 2 and the movable magazine 4 neighboring to the cartridge loading/unloading face 2a, while setting the position of the cartridge transporting device 6 by applying feed to the cartridge transporting device 6 to the end position of the second longitudinal moving path (T2), more specifically, to the intersection point between the longitudinal moving path (T2) and the lateral moving path of the cartridge transporting device 6 (step s12).

When the processing of the lateral-feeding control device 117 and the rearrangement control device 119 is completed, the CPU 29 functioning as the lateral-feeding control device 121 then finds the position of the cell to which the cartridge having the identification information designated as the mount target by referring to the information in the right-magazine cartridge position temporary storage table shown in FIG. 15B.

Further, the CPU 29 functioning as the longitudinal-feeding control device 121 rotates the longitudinal-feeding pinion 16 by drive-controlling the longitudinal-feeding pinion driving motor My that configures a part of the transporting-device longitudinal feeding device 120 so as to move the cartridge transporting device 6 along the second longitudinal moving path (T2), more specifically, along the transporting device retraction rack 17 on the laterally-moving plate 13 and the second longitudinal-feeding rack 28 on the magazine plate 10 to set the position of the cartridge transporting device 6 at the position of the column of the cell to which the cartridge 19 having the designated identification information is housed (position along the back-to-front direction in FIG. 1).

Furthermore, the CPU 29 drive-controls the container up/down motor Mz of the cartridge transporting device 6 to move the cartridge housing container 20 in the vertical direction so as to align the height of the cartridge loading/unloading port 21 of the cartridge housing container 20 with the position of the row of the cell to which the cartridge 19 having the designated identification information is housed (position along the height direction in FIG. 1) (step s13).

The longitudinal-feeding control device 121 actually refers in the processing of step s13 to find the cell position is the information in the right-magazine cartridge position temporary storage table shown in FIG. 15B. However, contents thereof are the same as those in the first fixed magazine housing position storage table shown in FIG. 12C. Thus, it can also be said that the longitudinal-feeding control device 121 refers to the housing position storage tables for finding the cell position.

As described above, in this state, the cartridge housing container 20 of the cartridge transporting device 6 is facing in the direction with which the cartridge can be passed and received in both sides of the cartridge transporting device 6 in the lateral-width direction, i.e., in the left and right directions of FIG. 7. Thus, the CPU 29 drive-controls the loading/unloading unit 38 within the cartridge housing container 20 to place the cartridge 19 having the identification information designated as the mount target into the cartridge housing container 20 (step s14).

Then, the CPU 29 rotates the longitudinal-feeding pinion 16 by drive-controlling the longitudinal-feeding pinion driving motor My that configures a part of the transporting-device longitudinal feeding device 120 so as to move the cartridge transporting device 6 along the second longitudinal moving path (T2), more specifically, along the second longitudinal-feeding rack 28 on the magazine plate 10 and the transporting device retraction rack 17 on the laterally-moving plate 13 to return the position of the cartridge transporting device 6 to the retracting position on the laterally-moving plate 13 (the position of the cartridge transporting device 6 shown in FIG. 7). At the same time, the CPU 29 drive-controls the container up/down motor Mz of the cartridge transporting device 6 to move the cartridge housing container 20 in the vertical direction so as to align the height of the cartridge loading/unloading port 21 of the cartridge housing container 20 with the height of the cartridge loading/unloading port of the magnetic tape drive 5 (step s15).

Then, the CPU 29 drive-controls the lateral-feeding pinion driving motor Mx that configures a part of the transporting-device lateral feeding device 116 and the magazine rearranging device 118 to rotate the lateral-feeding pinion 24 that configures a part of the transporting-device lateral feeding device 116 and the magazine rearranging device 118 in a clockwise direction of FIG. 6, i.e., in a counterclockwise direction of FIG. 7, so as to apply feed to the lateral-feeding rack 22 of the laterally-moving plate 13 on which the cartridge transporting device 6 is loaded towards the left direction in FIG. 7 along the lateral moving path that is offset from the magazine moving area (B) towards the outer side. At the same time, the CPU 29 applies feed to the lateral-feeding rack 23 of the magazine plate 10 to which the movable magazine 4 is fixedly provided towards the right direction in FIG. 7 along the lateral-width direction of the magazine arranging area (A) to return the cartridge transporting device 6 and the movable magazine 4 to the initial positions as in FIG. 2 (step s16).

Then, the CPU 29 rotates the cartridge housing container 20 by drive-controlling the container rotating motor Mr by 90 degrees to align the facing direction of the cartridge loading/unloading port 21 of the cartridge housing container 20 with the facing direction of the cartridge loading/unloading port of the magnetic tape drive 5 (step s8), mounts the cartridge 19 having the identification information designated as the mount target by inserting it to the cartridge loading/unloading port of the magnetic tape drive 5 (step s9), and temporarily stores the identification information of the mounted cartridge 19 to the identification information storing register R of the RAM 31 (step s10).

When an unmount instruction from the higher-order device (not shown) such as the personal computer or the work station is inputted to the magnetic tape drive 5, the mount instruction is inputted to the CPU 29 of the control unit 7 from the magnetic tape drive 5 via the input/output circuit 33.

The input of the unmount instruction is detected by the CPU 29 with the judging processing of step s17.

When the input of the unmount instruction is detected in the judging processing of step s17, the CPU 29 functioning as the moving-path forming position selecting device 115 first specifies the cartridge that is currently mounted to the magnetic tape drive 5 based on the identification information stored in the identification information storing register R of the RAM 31, while searching the housing position storage tables as in FIG. 12A, FIG. 12B, and FIG. 12C based on the identification information (step s18) so as to judge whether the cartridge loading/unloading face of the cell to which the currently mounted cartridge 19 is to be returned belongs to the cartridge loading/unloading face 3a of the second fixed magazine 3, the cartridge loading/unloading face 4a of the movable magazine 4, or the cartridge loading/unloading face 2a of the first fixed magazine 2 (step s19).

For example, when the identification information of the currently mounted cartridge 19 is "F", the judgment result in step s19 becomes true since the identification information "F" is stored in the housing position storage table which stores the cartridge housing positions by corresponding to the cartridge loading/unloading face 3a of the second fixed magazine 3 as shown in FIG. 12A. Further, when the identification information of the currently mounted cartridge 19 is "W", for example, the judgment result in step s19 becomes false since the identification information "W" is stored in the housing position storage table which stores the cartridge housing positions by corresponding to the cartridge loading/unloading face 2a of the first fixed magazine 2 as shown in FIG. 12C.

When the judgment result in step s19 is true, i.e., when it is found that the returning cell of the cartridge 19 belongs to the cartridge loading/unloading face 3a of the second fixed magazine 3 or the cartridge loading/unloading face 4a of the movable magazine 4, the CPU 29 functioning as the moving-path forming position selecting device 115 selects the longitudinal moving path between the cartridge loading/unloading face 3a of the second fixed magazine 3 and the moving magazine 4 neighboring to the cartridge loading/unloading face 3a or the longitudinal moving path between the cartridge loading/unloading face 4a of the movable magazine 4 and the second fixed magazine 3 neighboring to the cartridge loading/unloading face 4a (no matter which paths), i.e., the first longitudinal moving path (T1), as the longitudinal moving path forming position.

Regarding the contents of the left-magazine cartridge position temporary storing table shown in FIG. 14A and the contents of the right-magazine cartridge position temporary storing table shown in FIG. 14B, it is unnecessary to perform rewriting processing of the tables such as step s4 at the time of mounting the cartridge, since no writing operation is conducted from the point where the cartridge 19 that is currently the target of unmount is mounted up to this point.

As described above, when the CPU 29 functioning as the moving path forming position selecting device 115 selects the first longitudinal moving path (T1) that is the longitudinal moving path between the cartridge loading/unloading face 3a of the second fixed magazine 3 and the moving magazine 4 neighboring to the cartridge loading/unloading face 3a or the longitudinal moving path between the cartridge loading/unloading face 4a of the movable magazine 4 and the second fixed magazine 3 neighboring to the cartridge loading/unloading face 4a as the longitudinal moving path forming position, the cartridge 19 having the identification information designated as the unmount target can be returned to the corresponding cell by moving the cartridge transporting device 6 along the first longitudinal moving path (T1) while keeping the initial state as in FIG. 2. Therefore, it is unnecessary to form a longitudinal moving path anew by operating the rearrangement control device 119 and the magazine rearranging device 118 or to set the position on the longitudinal moving path by operating the transporting-device lateral feeding device 116 and the lateral-feeding control device 117.

Thus, the CPU 29 places the cartridge 19 having the identification information designated as the unmount target, i.e., the cartridge 19 that is currently mounted to the magnetic tape drive 5, to the inside the cartridge housing container 20 from the cartridge loading/unloading port of the magnetic tape drive 5 (step s20). Thereafter, the CPU 29 drive-controls the container rotating motor Mr to rotate the cartridge housing container 20 by −90 degrees to return the facing direction of the cartridge loading/unloading port 21 of the cartridge housing container 20 from the direction towards the magnetic tape drive 5, i.e., from the direction of the mount-completed point, to the initial state where the cartridge can be passed and received in the left and right directions (step s21).

Then, the CPU 29 functioning as the longitudinal-feeding control device 121 finds the position of the cell that corresponds to the identification information of the cartridge 19 designated as the unmount target by referring to the information in the left-magazine cartridge position temporary storage table shown in FIG. 14A and the information in the right-magazine cartridge position temporary storage table shown in FIG. 14B.

Then, the CPU 29 functioning as the longitudinal-feeding control device 121 rotates the longitudinal-feeding pinion 16 by drive-controlling the longitudinal-feeding pinion driving motor My that configures a part of the transporting-device longitudinal feeding device 120 so as to move the cartridge transporting device 6 along the first longitudinal moving path (T1), more specifically, along the transporting device retraction rack 17 on the laterally-moving plate 13 and the first longitudinal-feeding rack 27 on the magazine plate 10 to set the position of the cartridge transporting device 6 at the position of the column of the cell to which the cartridge 19 having the identification information designated as the unmount target is to be returned (position along the back-to-front direction in FIG. 1).

Furthermore, the CPU 29 drive-controls the container up/down motor Mz of the cartridge transporting device 6 to move the cartridge housing container 20 in the vertical direction so as to align the height of the cartridge loading/unloading port 21 of the cartridge housing container 20 with the position of the row of the cell to which the cartridge 19 to be returned (position along the height direction in FIG. 1) (step s22).

Thus, the CPU 29 drive-controls the loading/unloading unit 38 within the cartridge housing container 20 depending on whether the cartridge loading/unloading face of the cell to which the cartridge 19 having the identification information designated as the unmount target is housed belongs to the cartridge loading/unloading face 3a of the second fixed magazine 3 or belongs to the cartridge loading/unloading face 4a of the movable magazine 4, and houses the cartridge 19 having the identification information designated as the unmount target, i.e., the cartridge 19 that is currently being housed inside the cartridge housing container 20, into the returning cell (step s23).

Then, the CPU 29 rotates the longitudinal-feeding pinion 16 by drive-controlling the longitudinal-feeding pinion driving motor My that configures a part of the transporting-device longitudinal feeding device 120 so as to move the cartridge transporting device 6 along the first longitudinal moving path (T1), more specifically, along the first longitudinal-feeding rack 27 on the magazine plate 10 and the transporting device retraction rack 17 on the laterally-moving plate 13 to set the position of the cartridge transporting device 6 at the position in front of the magnetic tape drive 5 (step s24). Then, the CPU 29 clears the identification information stored to the identification information storing register R of the RAM 31 (step s25), and ends the unmount processing.

At this point, the facing direction of the cartridge loading/unloading mount 21 of the cartridge housing container 20 is returned to the direction with which the cartridge can be passed and received in the left and right directions, and the cartridge 19 as the unmount target is ejected from the cartridge housing container 20. Therefore, each of the parts of the magnetic-tape library device 1 is to return to the initial state completely, when the cartridge transporting device 6 is moved and set at the position in front of the magnetic tape drive 5.

In the meantime, when the judgment result in step s19 becomes false, i.e., when it is found that the cell to which the cartridge 19 as the unmount target is to be returned belongs to the cartridge loading/unloading face 2a of the first fixed magazine 2, the CPU 29 functioning as the moving-path forming position selecting device 115 selects the longitudinal moving path between the cartridge loading/unloading face 2a of the first fixed magazine 2 and the moving magazine 4 neighboring to the cartridge loading/unloading face 2a, i.e., the second longitudinal moving path (T2), as the longitudinal moving path forming position.

Like the above-described case, regarding the contents of the right-magazine cartridge position temporary storage table shown in FIG. 15B, it is unnecessary to perform rewriting processing of the tables such as step s11 at the time of mounting the cartridge, since no writing operation is conducted from the point where the cartridge 19 that is currently the target of unmount is mounted to this point.

Thus, the CPU 29 places the cartridge 19 having the identification information designated as the unmount target, i.e., the cartridge 19 that is currently mounted to the magnetic tape drive 5, to the inside the cartridge housing container 20 from the cartridge loading/unloading port of the magnetic tape drive (step s26). Thereafter, the CPU 29 drive-controls the container rotating motor Mr to rotate the cartridge housing container 20 by −90 degrees to return the facing direction of the cartridge loading/unloading port 21 of the cartridge housing container 20 from the direction towards the magnetic tape drive 5, i.e., from the direction of the mount-completed point, to the initial state where the cartridge can be passed and received in the left and right directions (step s27).

When the CPU 29 functioning as the moving-path forming position selecting device 115 selects the second longitudinal moving path (T2) that is the longitudinal moving path between the cartridge loading/unloading face 2a of the first fixed magazine 2 and the moving magazine 4 neighboring to the cartridge loading/unloading face 2a, the cartridge transporting device 6 cannot be moved along the selected longitudinal moving path, i.e., the second longitudinal moving path (T2), when the initial state as in FIG. 2 is being maintained.

Thus, the CPU 29 functioning as the lateral-feeding control device 117 and the rearrangement control device 119 drive-controls the lateral-feeding pinion driving motor Mx that configures a part of the transporting-device lateral feeding device 116 and the magazine rearranging device 118 to rotate the lateral-feeding pinion 24 that configures a part of the transporting-device lateral feeding device 116 and the magazine rearranging device 118 in a counterclockwise direction of FIG. 6, i.e., in a clockwise direction of FIG. 2, so as to apply feed to the lateral-feeding rack 22 of the laterally-moving plate 13 on which the cartridge transporting device 6 is loaded towards the right direction in FIG. 2 along the lateral moving path that is offset from the magazine moving area (B) towards the outer side.

At the same time, by utilizing the rotating action of the lateral-feeding pinion 24, the CPU 29 functioning as the lateral-feeding control device 117 and the rearrangement control device 119 applies feed to the lateral-feeding rack 23 of the magazine plate 10 to which the movable magazine 4 is fixedly provided towards the left direction in FIG. 2 along the lateral-width direction of the magazine arranging area (A).

By utilizing the two feeding actions associated with the rotating action of the lateral-feeding pinion 24 in this manner, the CPU 29 functioning as the lateral-feeding control device 117 and the rearrangement control device 119 moves the movable magazine 4 on the magazine plate 10 to the second fixed magazine 3 side to form the second longitudinal moving path (T2) having the width that equals to the lateral width of the cartridge transporting device 6 between the cartridge loading/unloading face 2a of the first fixed magazine 2 and the movable magazine 4 neighboring to the cartridge loading/unloading face 2a, while setting the position of the cartridge transporting device 6 by applying feed to the cartridge transporting device 6 to the end position of the second longitudinal moving path (T2), more specifically, to the intersection point between the longitudinal moving path (T2) and the lateral moving path of the cartridge transporting device 6 (step s28).

When the processing of the lateral-feeding control device 117 and the rearrangement control device 119 is completed in this manner, the CPU 29 functioning as the lateral-feeding control device 121 then finds the position of the cell to which the cartridge having the identification information designated as the unmount target by referring to the information in the right-magazine cartridge position temporary storage table shown in FIG. 15B.

Further, the CPU 29 functioning as the longitudinal-feeding control device 121 rotates the longitudinal-feeding pinion 16 by drive-controlling the longitudinal-feeding pinion driving motor My that configures a part of the transporting-device longitudinal feeding device 120 so as to move the cartridge transporting device 6 along the second longitudinal moving path (T2), more specifically, along the transporting device retraction rack 17 on the laterally-moving plate 13 and the second longitudinal-feeding rack 28 on the magazine plate 10 to set the position of the cartridge transporting device 6 at the position of the column of the cell to which the cartridge 19 having the identification information designated as the unmount target is returned (position along the back-to-front direction in FIG. 1).

Furthermore, the CPU 29 drive-controls the container up/down motor Mz of the cartridge transporting device 6 to move the cartridge housing container 20 in the vertical direction so as to align the height of the cartridge loading/unloading port 21 of the cartridge housing container 20 with the position of the row of the cell to which the cartridge 19 having the designated identification information is housed (position along the height direction in FIG. 1) (step s29).

Thus, the CPU 29 drive-controls the loading/unloading unit 38 within the cartridge housing container 20, and houses the cartridge 19 having the identification information designated as the unmount target, i.e., the cartridge 19 that is currently housed inside the cartridge housing container 20, into the returning cell (step s30).

Then, the CPU 29 rotates the longitudinal-feeding pinion 16 by drive-controlling the longitudinal-feeding pinion driving motor My that configures a part of the transporting-device longitudinal feeding device 120 so as to move the cartridge transporting device 6 along the second longitudinal moving path (T2), more specifically, along the second longitudinal-feeding rack 28 on the magazine plate 10 and the transporting device retraction rack 17 on the laterally-moving plate 13 to return the position of the cartridge transporting device 6 to the retracting position on the laterally-moving plate 13 (the position of the cartridge transporting device 6 shown in FIG. 7). At the same time, the CPU 29 drive-controls the container up/down motor Mz of the cartridge transporting device 6 to move the cartridge housing container 20 in the vertical direction so as to align the height of the cartridge loading/unloading port 21 of the cartridge housing container 20 with the height of the cartridge loading/unloading port of the magnetic tape drive 5 (step s31).

Then, the CPU 29 drive-controls the lateral-feeding pinion driving motor Mx that configures a part of the transporting-device lateral feeding device 116 and the magazine rearranging device 118 to rotate the lateral-feeding pinion 24 that configures a part of the transporting-device lateral feeding device 116 and the magazine rearranging device 118 in a clockwise direction of FIG. 6, i.e., in a counterclockwise direction of FIG. 7, so as to apply feed to the lateral-feeding rack 22 of the laterally-moving plate 13 on which the cartridge transporting device 6 is loaded towards the left direction in FIG. 7 along the lateral moving path that is offset from the magazine moving area (B) towards the outer side. At the same time, the CPU 29 applies feed to the lateral-feeding rack 23 of the magazine plate 10 to which the movable magazine 4 is fixedly provided towards the right direction in FIG. 7 along the lateral-width direction of the magazine arranging area (A) to return the cartridge transporting device 6 and the movable magazine 4 to the initial positions as in FIG. 2 (step s32). Then, the CPU 29 clears the identification information stored to the identification information storing register R of the RAM 31 (step s25), and ends the unmount processing.

At this point, the facing direction of the cartridge loading/unloading mount 21 of the cartridge housing container 20 is returned to the direction with which the cartridge can be passed and received in the left and right directions, and the cartridge 19 as the unmount target is ejected from the cartridge housing container 20. Therefore, each of the parts of the magnetic-tape library device 1 is to return to the initial state completely, when the cartridge transporting device 6 and the movable magazine 4 are moved to be returned to the initial positions.

Particularly, this exemplary embodiment uses a single driving source, i.e., the lateral-feeding pinion driving motor Mx, in common for the driving source of the magazine rearranging device 118 which selectively generates the first longitudinal moving path (T1) or the second longitudinal moving path (T2) by moving the movable magazine 4 in the lateral-width direction and for the driving source of the transporting-device lateral feeding device 116 which applies feed to the cartridge transporting device 6 in the lateral-width direction. Therefore, the size and weight of the magnetic-tape library device as well as the manufacturing cost thereof can be reduced.

Further, this exemplary embodiment is structured particularly in such a manner that: the cells of the first fixed magazine 2 and the second fixed magazine 3 are arranged in two rows and four columns, and the cells of the movable magazine 4 are arranged in two rows and three columns; and the length that is the sum of the length of the cartridge transporting device 6 and the length of the movable magazine 4 almost equals to the lengths of the first fixed magazine 1 and the second fixed magazine.

As a result, as shown in FIG. 2 or FIG. 7, the cartridge transporting device 6 can move along the lateral moving path within the area that corresponds to the difference between the length of the movable magazine 4 and the lengths of the first and second fixed magazine 2 and 3, more specifically, within the area that corresponds to the area surrounded by the power supply part 8, the magnetic tape drive 5, the control unit 7, the first fixed magazine 2, the movable magazine 4, and the second fixed magazine 3. Therefore, it is possible with this exemplary embodiment to arrange the structural elements that are required for the magnetic-tape library device 1 in a dense manner. This makes it possible to provide the small-sized magnetic-tape library device (particularly reduced in the width and the depth (length from the front to back)).

As an exemplary advantage according to the cartridge transporting method of the storage medium library device of the present invention, it is unnecessary to provide a permanent longitudinal moving path between each of the magazines, even when a plurality of magazines are provided. This makes it possible to house a great number of cartridges by effectively utilizing the space for forming the moving paths that are required for the cartridge transporting device to move.

In the above, as a way of example, there is described the case of providing the cartridge loading/unloading face 4a on one side (more specifically, on the left end face) of the movable magazine 4 in the lateral-width direction. With the structure that includes the cartridge transporting device 6 having the bidirectional loading/unloading function as in the case of this exemplary embodiment, it is possible to house still greater number of cartridges 19 in a dense manner through setting the lateral width of the movable magazine 4 to be twice the lateral width of the cartridge 19, housing two cartridges 19 in parallel within a cell, and providing the cartridge loading/unloading face on the end faces of both sides.

Even in such case, the structure in terms of the appearance is completely the same as that of FIG. 1 and the lateral width of the movable magazine 4 is simply increased. Thus, explanations regarding the structure will be omitted, and the processing operations regarding loading and unloading of the cartridge will simply be described by naming the cartridge loading/unloading face on the left-end face of the movable magazine 4 as a cartridge loading/unloading face 4a and the cartridge loading/unloading face on the right-end face of the movable magazine 4 as a cartridge loading/unloading face 4b (not shown).

Even in a case where such structure is employed, it is also necessary to have the second fixed magazine housing position storage table as in FIG. 12A and the first fixed magazine housing position storage table as in FIG. 12C. Further, instead of the movable magazine housing position storage table as in FIG. 12B, a movable magazine left-side face housing position storage table and a movable magazine right-side face housing position storage table are built and stored to the nonvolatile memory 32.

Note here that the movable magazine left-side face housing position storage table is a table which stores the corresponding relations between each of the cells in two rows and three columns having the cartridge loading/unloading ports on the cartridge loading/unloading face 4a of the movable magazine 4 and the identification information of the cartridges 19 that are stored in each cell. Further, the movable magazine right-side face housing position storage table is a table which stores the corresponding relations between each of the cells in two rows and three columns having the cartridge loading/unloading ports on the cartridge loading/unloading face 4b of the movable magazine 4 and the identification information of the cartridges 19 that are stored in each cell.

Regarding the actual drive control of the magnetic-tape library device having such structure, the flowcharts shown in FIG. 10 and FIG. 11 can simply be employed. However, in the processing of step s4, the information in the second fixed magazine housing position storage table shown in FIG. 12A is stored to the left-magazine cartridge position temporary storage table shown in FIG. 13A, and the information in the movable magazine left-side face housing position storage table is stored to the right-magazine cartridge position temporary storage table shown in FIG. 13B. Further, regarding the processing of steps s5-s6 and the processing of steps s22-s23, the position of the cell to which the cartridge 19 having the identification information designated as the mount target is housed or the position of the cell to which the cartridge 19 having the identification information designated as the unmount target is returned is obtained by referring to the information in the left-magazine cartridge position temporary storage table shown in FIG. 13A (i.e., the information in the second fixed magazine housing position storage table) and the information in the right-magazine cartridge position temporary storage table shown in FIG. 13B (i.e., the information in the movable magazine left-side face housing position storage table), and the cartridge transporting device 6 is moved along the first longitudinal moving path (T1) to set the position of the cartridge transporting device 6 at the obtained cell position (processing substituted for step S5 and step s22). The loading/unloading unit 38 within the cartridge housing container 20 is drive-controlled depending on whether the cartridge loading/unloading face of the cell to which the cartridge 19 having the identification information designated as the mount target or the unmount target is housed belongs to the cartridge loading/unloading face 3a of the second fixed magazine 3 or belongs to the cartridge loading/unloading face 4a of the movable magazine 4, and places the cartridge 19 having the identification information designated as the mount target or the unmount target into the cartridge housing container 20 or sends it out from the cartridge housing container 20 (processing substituted for step s6 and step s23).

Similarly, in the processing of step s11, the information in the movable magazine right-side face housing position storage table is stored to the left-magazine cartridge position temporary storage table shown in FIG. 13A, and the information in the first fixed magazine housing position storage table is stored to the right-magazine cartridge position temporary storage table shown in FIG. 13B. Further, regarding the processing of steps s13-s14 and the processing of steps s29-s30, the position of the cell to which the cartridge 19 having the identification information designated as the mount target is housed or the position of the cell to which the cartridge 19 having the identification information designated as the unmount target is returned is obtained by referring to the information in the left-magazine cartridge position temporary storage table shown in FIG. 13A (i.e., the information in the movable magazine right-side face housing position storage table) and the information in the right-magazine cartridge position temporary storage table shown in FIG. 13B (i.e., the information in the first fixed magazine housing position storage table), and the cartridge transporting device 6 is moved along the second longitudinal moving path (T2) to set the position of the cartridge transporting device 6 at the obtained cell position (processing substituted for step S13 and step s29). The loading/unloading unit 38 within the cartridge housing container 20 is drive-controlled depending on whether the cartridge loading/unloading face of the cell to which the cartridge 19 having the identification information designated as the mount target or the unmount target is housed belongs to the cartridge loading/unloading face 4b of the movable magazine 4 or belongs to the cartridge loading/unloading face 2a of the first fixed magazine 2, and places the cartridge 19 having the identification information designated as the mount target or the unmount target into the cartridge housing container 20 or sends it out from the cartridge housing container 20 (processing substituted for step s14 and step s30).

Further, as in the exemplary embodiment described in the beginning, it is also effective to load the cartridge transporting device 6 having the bidirectional loading/unloading function even for the structure where the cartridge loading/unloading face 4a is provided only on the left-end face of the movable magazine 4 to load and unload the cartridge only from the one side of the movable magazine 4. Assuming that the cartridge transporting device 6 can only load and unload the cartridge from the magazine neighboring to itself on the left side thereof, it becomes necessary to move the movable magazine 4 to the left side even for loading or unloading the cartridge to/from the cell of the movable magazine 4. Furthermore, when loading/unloading the cartridge to/from the cell of the first fixed magazine 2, it is necessary to shorten the size (cells of four columns) of the first fixed magazine 2 to be about the size of the movable magazine 4 (cells of three columns), and to move the first fixed cell 2 itself to the left direction. However, by employing the cartridge transporting device 6 having the bidirectional loading/unloading function, it is possible to prevent having problems e.g., performing ineffectual actions such as moving the movable magazine 4 to the left side for loading/unloading the cartridge to/from the cell of the movable magazine 4, complicating the structure caused for making it possible to move the first fixed magazine 2 to the left side in order to load/unload the cartridge to/from the first fixed magazine 2, and reducing the possible number of the housed cartridges 19 due to the shortening of the size of the first fixed magazine 2.

Figure 16:
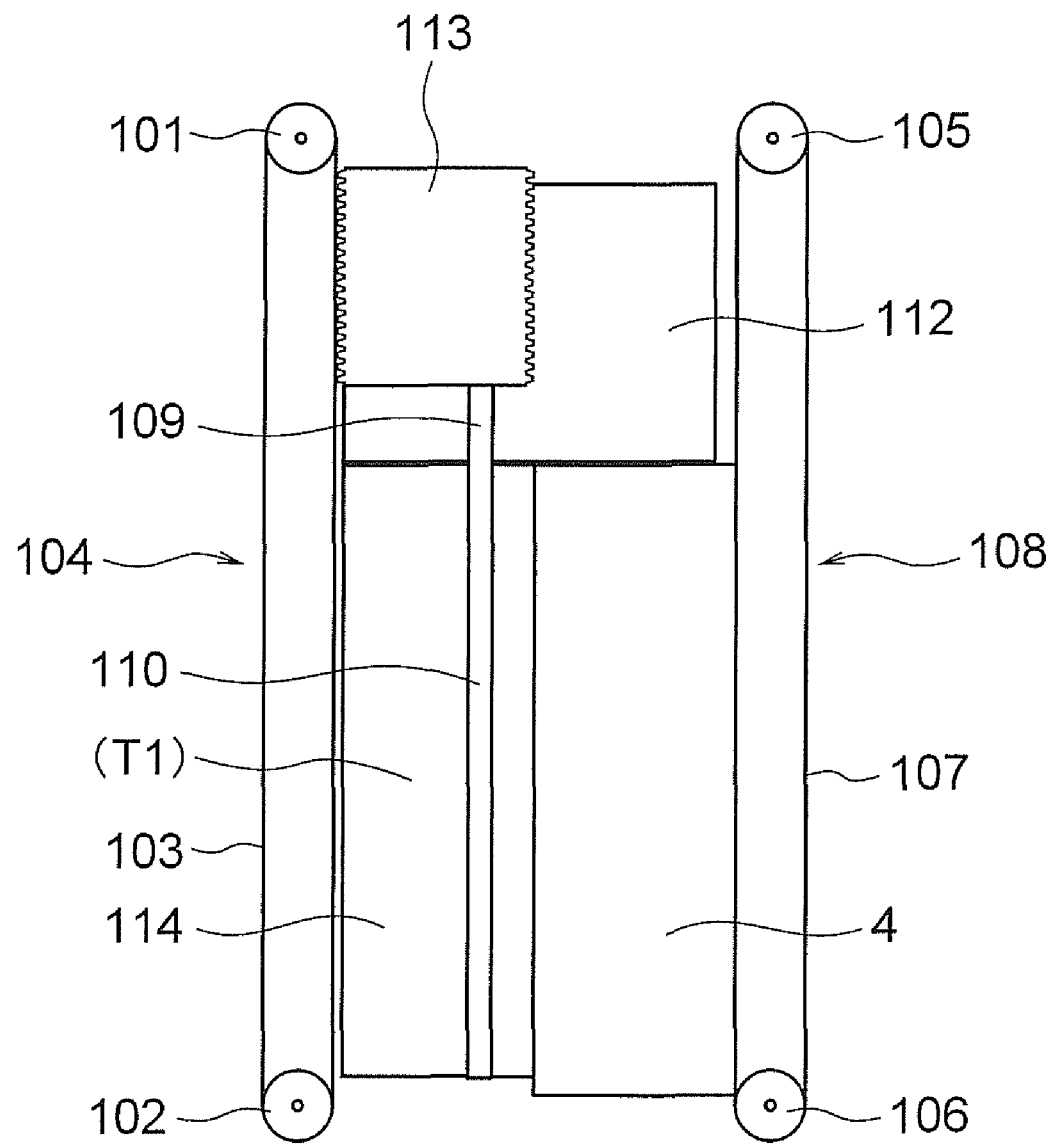
FIG. 16 is a plan view showing an example of another structure of a transporting-device longitudinal feeding device of the transporting device.

FIG. 16 is a plan view showing an example of another structure of a transporting-device longitudinal feeding device of the transporting device for applying feed to the cartridge transporting device 6 along the first longitudinal moving path (T1) and the second longitudinal moving path (T2).

The transporting-device longitudinal feeding device shown in FIG. 16 includes: a first belt conveyor device 104 that is provided on the base plate 9 across over a laterally-moving plate 112 and a magazine plate 114 to be in contact with the face of the second fixed magazine 3 side in a cartridge transporting device 113 while the cartridge transporting device 113 is located on the extended line of the first longitudinal moving path (T1); a second belt conveyor device 108 that is also provided on the base plate 9 across over the laterally-moving plate 112 and the magazine plate 114 to be in contact with the face of the first fixed magazine 2 side in the cartridge transporting device 113 while the cartridge transporting device 113 is located on the extended line of the second longitudinal moving path (T2); a transporting-device retraction rail 109 that is provided, instead of the transporting-device retraction rack 17 shown in FIG. 4, on the laterally-moving plate 112 at the same position as that of the transporting-device retraction rack 17; and a first and a second longitudinal feeding rails 110, 111 (the second longitudinal feeding rail 111 is not illustrated) which are provided, instead of the first and second longitudinal feeding racks 27, 28 shown in FIG. 3, on the magazine plate 114 at the same positions as those of the first and the second longitudinal feeding racks 27, 28.

The first belt conveyor device 104 is configured with a driving pulley 101 provided on the base plate 9 to be freely rotatable, a driven pulley 102, and a timing belt 103 suspended about the driving pulley 101 and the driven pulley 102. The second belt conveyor device 108 is configured with a driving pulley 105 provided on the base plate 9 to be freely rotatable, a driven pulley 106, and a timing belt 107 suspended about the driving pulley 105 and the driven pulley 106.

Further, the transporting-device retraction rail 109 and the first, second longitudinal feeding rails 110, 111 are protruded strips having formicary-form cross sections. Instead of the longitudinal-feeding pinion 16 and the guide piece 18 shown in FIG. 4 and FIG. 5, through-hole grooves having the formicary-form cross sections are provided on the bottom face of the cartridge transporting device 113. It is not structured to have the cartridge transporting device 113 driven by itself, so that it is unnecessary to provide the longitudinal-feeding pinion motor My built-in to the cartridge transporting device 113.

The driving pulley 101 and the driving pulley 105 are formed to rotate synchronously in opposite directions from each other by a longitudinal-feeding driving motor (not shown) which is built-in to the base plate 9. This longitudinal-feeding driving motor is the motor that configures the driving source for the transporting-device longitudinal feeding device instead of the longitudinal-feeding pinion driving motor My described above. It is connected to the driving pulley 101 and the driving pulley 105 via a power transmitting system (not shown) provided within the base plate 9 in such a manner that the driving pulley 105 rotates in the counterclockwise direction of FIG. 16 when the driving pulley 101 rotates in the clockwise direction of FIG. 16, and the driving pulley 105 rotates in the clockwise direction of FIG. 16 when the driving pulley 101 rotates in the counterclockwise direction of FIG. 16.

Therefore, as shown in FIG. 16, even when the timing belt 103 comes in contact with the face of the second fixed magazine 3 side (face on the left side in FIG. 16) in the cartridge transporting device 113 while the cartridge transporting device 113 is located on the extended line of the first longitudinal moving path (T1) or, inversely from this, even when the timing belt 107 comes in contact with the face of the first fixed magazine 2 side (face on the right side in FIG. 16) in the cartridge transporting device 113 while the cartridge transporting device 113 is located on the extended line of the second longitudinal moving path (T2), the moving directions of the cartridge transporting device 113 along the transporting-device retraction rail 109 and the first longitudinal-feeding rail 110 or along the transporting-device retraction rail 109 and the second longitudinal-feeding rail 111 are the same as long as the rotating directions of the longitudinal-feeding driving motor are the same. Further, it is desirable to provide rack-type protrusions in line on both sides (left and right sides) of the cartridge transporting device 113 and to provide, on the outer side of the timing belts 103, 107, rack-type protrusions to be fitted with the aforementioned protrusions as shown in FIG. 16 in order to prevent slipping or stepping out generated between the cartridge transporting device 113 and the timing belts 103, 107 which apply feed to the cartridge transporting device 113 in the longitudinal direction.

As described above, even when the side face of the cartridge transporting device 113 comes in contact with the timing belt 103 or the timing belt 107, the directions of the longitudinal feed applied to the cartridge transporting device 113 are the same as long as the rotating directions of the longitudinal-feeding driving motor are the same. Thus, it is possible to simply employ the flowcharts shown in FIG. 10 and FIG. 11 also for the case where the transporting-device longitudinal feeding device shown in FIG. 16 is employed, through drive-controlling the longitudinal-feeding driving motor that is substituted for the longitudinal-feeding pinion driving motor My regarding the whole driving controls related to the magnetic-tape library device 1. Specifically, the longitudinal-feeding driving motor is drive-controlled instead of the longitudinal-feeding pinion driving motor My in the processing of step s5, step s7, step s13, step s15, step s22, step s24, step s29, and step s31.

It is unnecessary to have the longitudinal-feeding pinion driving motor My built-in to the cartridge transporting device 113, when the structure of FIG. 16 is employed. Thus, it is easy to reduce the size of the cartridge transporting device 113 itself. Further, since the lateral-feeding driving motor can be set at an appropriate position within the base plate 9, it is advantageous in terms of increased versatility achieved in designing the layout.

As described above, these exemplary embodiments are structured in such a manner that the first fixed magazine 2 and the second fixed magazine 3 are fixedly placed at each of both ends in the lateral-width direction of the magazine providing area (A) having the lateral width that equals to the size obtained by adding the lateral width of the cartridge transporting device 6 to the sum of the first fixed magazine 2, the second fixed magazine 3, and the movable magazine 4, and the movable magazine 4 capable of individually moving in the lateral direction is placed therebetween. The cartridge loading/unloading face corresponding to the cell to which the cartridge 19 as the mount target to the magnetic tape drive 5 is being housed or the cell to which the cartridge 19 dismounted from the magnetic tape drive 5 is to be housed is found from the first fixed magazine housing position storage table, the second fixed magazine housing position storage table, and the movable magazine housing position storage table. The movable magazine 4 is moved in the lateral-width direction from the cartridge loading/unloading face as the boundary to selectively form the first longitudinal moving path (T1) or the second longitudinal moving path (T2) for allowing the cartridge transporting device 6 to move between the mutually neighboring magazines, i.e., between the second fixed magazine 3 and the movable magazine 4 or between the movable magazine 4 and the first fixed magazine 2, so as the move the cartridge transporting device 6 along the longitudinal moving path to pass and receive the cartridge 19 between each cell of the respective magazines and the magnetic tape drive 5. Therefore, there only requires the lateral width of a single cartridge transporting device 6 for the total lateral width of the longitudinal moving path that is necessary for the cartridge transporting device 6 to move, even if the three magazines 2, 3, and 4 are placed side by side in the lateral-width direction.

In general, when the three magazines are placed side by side, two or more lines of individual longitudinal moving paths for allowing the cartridge transporting device to move are required. Therefore, at least the space of one line of longitudinal moving path can be saved.

From another viewpoint, one of the two lines of the longitudinal moving paths that are originally required is utilized as the space for loading the magazine. This makes it possible to house the cartridges by effectively utilizing the inside space of the magnetic-tape library device 1.

While there has been described the case where the first fixed magazine 2 and the second fixed magazine 3 are fixedly provided at both ends in the lateral-width direction and only one movable magazine 4 capable of individually moving in the lateral direction is mounted therebetween, it is also possible to provide a plurality of movable magazines 4 between the first fixed magazine 2 and the second fixed magazine 3. In that case, it is also the same as the above-described case in respect that the lateral width (W) of the magazine providing area (A) is the lateral width that is obtained by adding the lateral width of the cartridge transporting device 6 to the sum of the lateral widths of all the magazines. Thus, if the movable magazines 4 are provided for two lines, the two lines of the paths among the three longitudinal moving paths that are originally required can be utilized as the space for loading the magazines. Further, if the movable magazines 4 are provided for three lines, the three lines of the paths among the four longitudinal moving paths that are originally required can be utilized as the space for loading the magazines.

While the present invention has been described above by referring to each of the exemplary embodiments, the present invention is not limited to those exemplary embodiments. Various changes and modifications that occur to those skilled in the art may be applied to the structures and details of the present invention. Further, it is to be understood that the present invention includes combinations of a part of or the whole part of the structures described in each of the exemplary embodiments.

What is claimed is:

1. A storage medium library device, comprising: magazines having a plurality of cells for housing cartridges each including a built-in storage medium; a storing/reproducing device which writes/reads data to/from the storage medium by mounting the cartridge; and a cartridge transporting device which transports the cartridge by reciprocating between each of the cells of the magazines and the storing/reproducing device, the library device including:

a first magazine and a second magazine disposed respectively at both ends of a magazine providing area in its lateral-width direction in such a manner that respective cartridge loading/unloading faces having cartridge loading/unloading ports for each of the cells become substantially in parallel to each other;

a movable magazine capable of freely moving in a direction orthogonal to the cartridge loading/unloading faces provided between the first magazine and the second magazine in such a manner that a cartridge loading/unloading face of the movable magazine becomes substantially in parallel to the cartridge loading/unloading faces of the first magazine and the second magazine;

a magazine rearranging device for forming a longitudinal moving path between the movable magazine and one of the first magazine or the second magazine by moving the movable magazine to a direction orthogonal to the cartridge loading/unloading face of the movable magazine;

a transporting-device lateral feeding device for setting position of the cartridge transporting device at an end part of the formed longitudinal moving path by moving the cartridge transporting device along a lateral moving path extended in parallel to the moving direction of the movable magazine at a position that does not interfere with a magazine moving area where the movable magazine moves; and a transporting-device longitudinal feeding device for moving the cartridge transporting device along the longitudinal moving path, wherein the storing/reproducing device is arranged at a position capable of passing and receiving the cartridge between the cartridge transporting device that is located on the lateral moving path.

2. The storage medium library device as claimed in claim 1, wherein the magazine providing area has a lateral width that is a size obtained by adding a lateral width of the cartridge transporting device to a sum of lateral widths of each of the magazines in the direction orthogonal to the cartridge loading/unloading faces.

3. The storage medium library device as claimed in claim 1, wherein the cartridge transporting device has a bidirectional loading/unloading function which can pass and receive the cartridge with each of the cells of the magazines in both sides of the lateral-width direction.

4. The storage medium library device as claimed in claim 3, wherein the movable magazine has the cartridge loading/unloading face on both sides in the lateral-width direction, and comprises two cells in the lateral-width direction.

5. The storage medium library device as claimed in claim 3, wherein: regarding lengths of the magazines in the direction orthogonal to the lateral-width direction along a plane of the magazine providing area, the length of the movable magazine is shorter than the lengths of the first magazine and the second magazine; and the length that is a sum of the length of the movable magazine and the length of the cartridge transporting device in the direction orthogonal to the lateral-width direction along the plane of the magazine providing area equals to the length of the first magazine and the length of the second magazine.

6. The storage medium library device as claimed in claim 1, wherein:
the first magazine and the second magazine are fixedly provided on a base plate of the storage medium library device with a gap provided therebetween;
a magazine plate extended out on both sides of the movable magazine along the lateral-width direction having a thickness of less than the gap is integrally fixed on a bottom face of the movable magazine, and the magazine plate is attached on the base plate with a restriction in moving direction set to the lateral-width direction;
the cartridge transporting device includes a longitudinal-feeding pinion projected to the bottom face of the cartridge transporting device and a longitudinal-feeding pinion driving motor which rotationally drives the longitudinal-feeding pinion, and the cartridge transporting device is attached on the base plate via the laterally-moving plate by having the lateral-feeding pinion engaged with a transporting-device retraction rack which is fixed in the direction orthogonal to the lateral-width direction provided to the laterally-moving plate attached on the base plate while the moving direction is being restricted along the lateral moving path so that a relative movement in the lateral-width direction with respect to the laterally-moving plate is restricted and a movement along the transporting-device retraction rack is permitted;
a lateral-feeding rack for moving the magazine plate and the laterally-moving plate in opposite directions from each other in the lateral-width direction is respectively provided at a counter part in the magazine plate for the laterally-moving plate and a counter part in the laterally-moving plate for the magazine plate to sandwich the lateral-feeding pinion protruded from the base plate so as to move the cartridge transporting device at a position on an extended line of a first longitudinal moving path that is formed between the second magazine and the movable magazine while the movable magazine on the magazine plate is moved on the first magazine side and to move the cartridge transporting device at a position on an extended line of a second longitudinal moving path that is formed between the first magazine and the movable magazine while the movable magazine on the magazine plate is moved on the second magazine side, and a lateral-feeding pinion driving motor for rotationally driving the lateral-feeding pinion is fixedly provided to the base plate;
a first and a second longitudinal-feeding racks communicated with the transporting-device retraction rack of the laterally-moving plate are fixedly provided on the magazine plate along the respective first and second longitudinal moving paths;
the transporting-device lateral feeding device is configured with a lateral-feeding rack of the laterally-moving plate, the lateral-feeding pinion, and the lateral-feeding pinion driving motor;
the magazine rearrangement device is configured with a lateral-feeding rack of the magazine plate, the lateral-feeding pinion, and the lateral-feeding pinion driving motor; and
the transporting-device longitudinal feeding device is configured with the longitudinal-feeding pinion, the longitudinal-feeding pinion driving motor, the transporting-device retraction rack, and the first and second longitudinal-feeding racks.

7. The storage medium library device as claimed in claim 6, comprising, instead of the transporting-device longitudinal feeding device, a transporting-device longitudinal feeding device that is configured with:
a first belt conveyor device that is provided on the base plate across over the laterally-moving plate and the magazine plate to be in contact with the face of the second fixed magazine side in the cartridge transporting device while the cartridge transporting device is located on the extended line of the first longitudinal moving path; a second belt conveyor device that is provided on the base plate across over the laterally-moving plate and the magazine plate to be in contact with the face of the first fixed magazine side in the cartridge transporting device while the cartridge transporting device is located on the extended line of the second longitudinal moving path; a transporting-device refraction rail that is provided instead of the transporting-device retraction rack; and a first and a second longitudinal feeding rails which are provided instead of the first and second longitudinal feeding racks.

8. The storage medium library device as claimed in claim 1, comprising:
a housing position storage table which stores corresponding relations between the cells of each of the cartridges and the storage mediums housed in each of the cells for each of the cartridge loading/unloading faces;
a moving-path forming position selecting device which finds, from the housing position storage table, the cartridge loading/unloading face including the cell to which the cartridge as a mount target for the storing/reproducing device is being stored or the cell to which the cartridge unmounted from the storing/reproducing device is to be housed according to an instruction from the storing/reproducing device, and selects a position between the cartridge loading/unloading face and the magazine neighboring to the cartridge loading/unloading face as a forming position of the longitudinal moving path;
a lateral-feeding control device which moves the cartridge transporting device to the end position of the longitudinal moving path that is selected by the moving-path forming position selecting device, through drive-controlling the transporting-device lateral feeding device;
a rearrangement control device which forms the longitudinal moving path that is selected by the moving-path forming position selecting device, through drive-controlling the magazine rearranging device; and a longitudinal-feeding control device which sets the position of the cartridge transporting device at the position of the cell to which the mount target is being housed or the cell to which the cartridge unmounted from the storing/reproducing device is to be housed, through driving the transporting-device longitudinal feeding device based on the cell position in the housing position storage table after completing actions of the lateral-feeing control device and the rearrangement control device.

9. A storage medium library device, comprising: magazines having a plurality of cells for housing cartridges each including a built-in storage medium; storing/reproducing means for writing/reading data to/from the storage medium by mounting the cartridge; and cartridge transporting means for transporting the cartridge by reciprocating between each of the cells of the magazines and the storing/reproducing means, the library device including:

a first magazine and a second magazine disposed respectively at both ends of a magazine providing area in its lateral-width direction in such a manner that respective cartridge loading/unloading faces having cartridge loading/unloading ports for each of the cells become substantially in parallel to each other;

a movable magazine capable of freely moving in a direction orthogonal to the cartridge loading/unloading faces provided between the first magazine and the second magazine in such a manner that a cartridge loading/unloading face of the movable magazine becomes substantially in parallel to the cartridge loading/unloading faces of the first magazine and the second magazine;

magazine rearranging means for forming a longitudinal moving path between the movable magazine and one of the first magazine or the second magazine by moving the movable magazine to a direction orthogonal to the cartridge loading/unloading face of the movable magazine;

transporting-means lateral feeding means for setting position of the cartridge transporting means at an end part of the formed longitudinal moving path by moving the cartridge transporting means along a lateral moving path extended in parallel to the moving direction of the movable magazine at a position that does not interfere with a magazine moving area where the movable magazine moves; and transporting-means longitudinal feeding means for moving the cartridge transporting means along the longitudinal moving path, wherein the storing/reproducing means is arranged at a position capable of passing and receiving the cartridge between the cartridge transporting means that is located on the lateral moving path.

10. A cartridge transporting method of a storage medium library device which moves a cartridge transporting device between a storing/reproducing device and magazines having a plurality of cells for housing cartridges each including a built-in storage medium to transport a given cartridge between a given cell of the cells of the magazines and the storing/reproducing device, the method comprising:

moving a movable magazine, which is attached to be movable between a first magazine of the magazines and a second magazine of the magazines provided respectively on a first side and a second side of a magazine providing area in its lateral width direction, to a direction orthogonal to a cartridge loading/unloading face of the movable magazine to form a longitudinal moving path between the movable magazine and the first magazine or the second magazine;

moving the cartridge transporting device along the longitudinal moving path; and transporting the given cartridge between the given cell, which is a cell of the first magazine or a cell of the second magazine, and the storing/reproducing device.

* * * * *